(12) United States Patent
Kim et al.

(10) Patent No.: US 11,620,084 B2
(45) Date of Patent: Apr. 4, 2023

(54) STORAGE DEVICE INCLUDING MEMORY CONTROLLER AND OPERATING METHOD OF MEMORY CONTROLLER

(71) Applicant: Samsung Electronics Co., Ltd., Suwon-si (KR)

(72) Inventors: Huijeong Kim, Yongin si (KR); Cheolho Kang, Hwaseong si (KR); Duckho Bae, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/479,704

(22) Filed: Sep. 20, 2021

(65) Prior Publication Data

US 2022/0206715 A1    Jun. 30, 2022

(30) Foreign Application Priority Data

Dec. 30, 2020  (KR) .................. 10-2020-0188209
Mar. 17, 2021  (KR) .................. 10-2021-0034867

(51) Int. Cl.
*G06F 3/06* (2006.01)
*G06F 12/0804* (2016.01)

(52) U.S. Cl.
CPC .......... *G06F 3/0659* (2013.01); *G06F 3/0604* (2013.01); *G06F 3/0656* (2013.01); *G06F 3/0679* (2013.01); *G06F 12/0804* (2013.01); *G06F 2212/1032* (2013.01)

(58) Field of Classification Search
None
See application file for complete search history.

(56) References Cited

U.S. PATENT DOCUMENTS

| | | | |
|---|---|---|---|
| 8,224,780 B2 | 7/2012 | Cargille et al. |
| 9,563,566 B2 | 2/2017 | Bahn et al. |
| 10,073,649 B2 | 9/2018 | DeJong |
| 10,817,390 B2 | 10/2020 | Shah et al. |
| 2015/0193464 A1 | 7/2015 | Kwon et al. |
| 2019/0146911 A1 | 5/2019 | Ha et al. |
| 2020/0159462 A1 | 5/2020 | Schneider et al. |
| 2020/0242021 A1 | 7/2020 | Gholamipour et al. |

FOREIGN PATENT DOCUMENTS

| | | |
|---|---|---|
| CN | 105893274 A | 8/2016 |
| DE | 102020112512 A1 | 2/2021 |
| KR | 10-2015-0082010 A | 7/2015 |
| KR | 10-1574451 B1 | 12/2015 |
| KR | 10-1805948 B1 | 12/2017 |
| KR | 10-2020-0060220 A | 5/2020 |

OTHER PUBLICATIONS

Extended European Search Report dated Apr. 26, 2022 for corresponding EP Patent Application No. 21207487.6.

*Primary Examiner* — Kevin Verbrugge
(74) *Attorney, Agent, or Firm* — Muir Patent Law, PLLC

(57) ABSTRACT

Disclosed are a storage device including a memory controller and a method of operating the memory controller. A storage device according to the technical idea of the present disclosure includes a write buffer for storing write data that is not grouped into a transaction, a non-volatile memory device including a journal buffer where journal logs are stored, a volatile memory device for temporarily storing first metadata, and a memory controller for updating the first metadata to the second metadata based on the journal log stored after the start of the checkpoint among the journal logs stored in the journal buffer.

20 Claims, 16 Drawing Sheets

STORAGE DEVICE INCLUDING MEMORY CONTROLLER AND OPERATING METHOD OF MEMORY CONTROLLER

CROSS-REFERENCE TO RELATED APPLICATIONS

This application is based on and claims priority under 35 U.S.C. § 119 to Korean Patent Application Nos. 10-2020-0188209, filed on Dec. 30, 2020, and 10-2021-0034867, filed on Mar. 17, 2021, in the Korean Intellectual Property Office, the disclosures of which are incorporated by reference herein in their entirety.

BACKGROUND

The present disclosure relates to an electronic device, and more particularly, to a storage device including a memory controller and a method of operating the memory controller.

Electronic devices such as smartphones, tablets, and computers may store various data in order to provide various user experiences. In order to operate various data, an electronic device may include a storage device that stores data under control of a host. The storage device may include a memory device that stores data and a memory controller that controls the memory device. Memory devices may be classified into volatile memory devices and non-volatile memory devices.

When an unexpected power-off problem, kernel panic, application crash, system crash, etc. occur during operation of the electronic device, some data in the storage device may be damaged. The electronic device may implement journaling in preparation for this situation. Journaling is a technique for tracking changed items by logging the changed items in memory before the changed items are reflected in the storage device.

SUMMARY

The present disclosure provides a method of operating a storage device and a memory controller to increase write performance by updating metadata based on the latest journal log stored after the checkpoint is triggered in the write operation for write data that is not grouped into a transaction.

In addition, the present disclosure provides a storage device and a method of operating a memory controller in order to minimize a decrease in performance due to journaling and reduce unnecessarily wasted power in the storage device.

In addition, the present disclosure provides a method of operating a storage device and a memory controller to ensure consistency between metadata and journal logs even when unexpected events such as sudden power off and kernel panic occur.

In one aspect, a storage device according to the technical idea of the present disclosure includes a non-volatile memory device including a write buffer in which write data that is not grouped into a transaction is stored, and a journal buffer in which a journal log indicating update information on metadata of the write data is stored; a volatile memory device configured to temporarily store first metadata; and a memory controller configured to control the volatile memory device to trigger a checkpoint for releasing the first journal log group in the journal buffer, update the first metadata to second metadata based on a second journal log group including a journal log excluding the first journal log group in the journal buffer, and store the second metadata wherein the first metadata is data updated based on a first journal log group including a journal log to be released from the journal buffer in response to a checkpoint event.

In another aspect, a storage device according to the technical idea of the present disclosure includes: a non-volatile storage device including a first memory area in which write data that is not grouped into a transaction is stored, a second memory area in which a journal log indicating update information on metadata of the write data is stored, and a third memory area in which the metadata is stored; a volatile memory device configured to temporarily store first metadata; and a memory controller configured to control the volatile memory device to trigger a checkpoint for deleting the first journal log group in the second memory area, update the first metadata to second metadata based on a second journal log group including a journal log excluding the first journal log group in the second memory area, and store the second metadata wherein the first metadata is data updated based on a first journal log group including a journal log to be deleted from the second memory area in response to a checkpoint event.

In another aspect, a method of operating a memory controller according to the spirit of the present disclosure includes: receiving first metadata stored in a non-volatile storage device and a journal log stored in a journal buffer in response to power provided from outside the memory controller and non-volatile storage device; generating second metadata, based on the journal log, the second metadata including map data indicating mapping information between a logical address and a physical address and allocation data indicating information on a memory area allocated in the non-volatile storage device; and providing, to the non-volatile storage device, a command instructing the non-volatile storage device to store the second metadata, a physical address of a memory block in which metadata is stored among a plurality of memory blocks included in the non-volatile storage device, and the second metadata wherein the first metadata is data updated based on a first journal log group including a journal log released from the journal buffer before the power is supplied.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Hereinafter, embodiments of the present invention will be described in detail with reference to the accompanying drawings.

Figure 1:
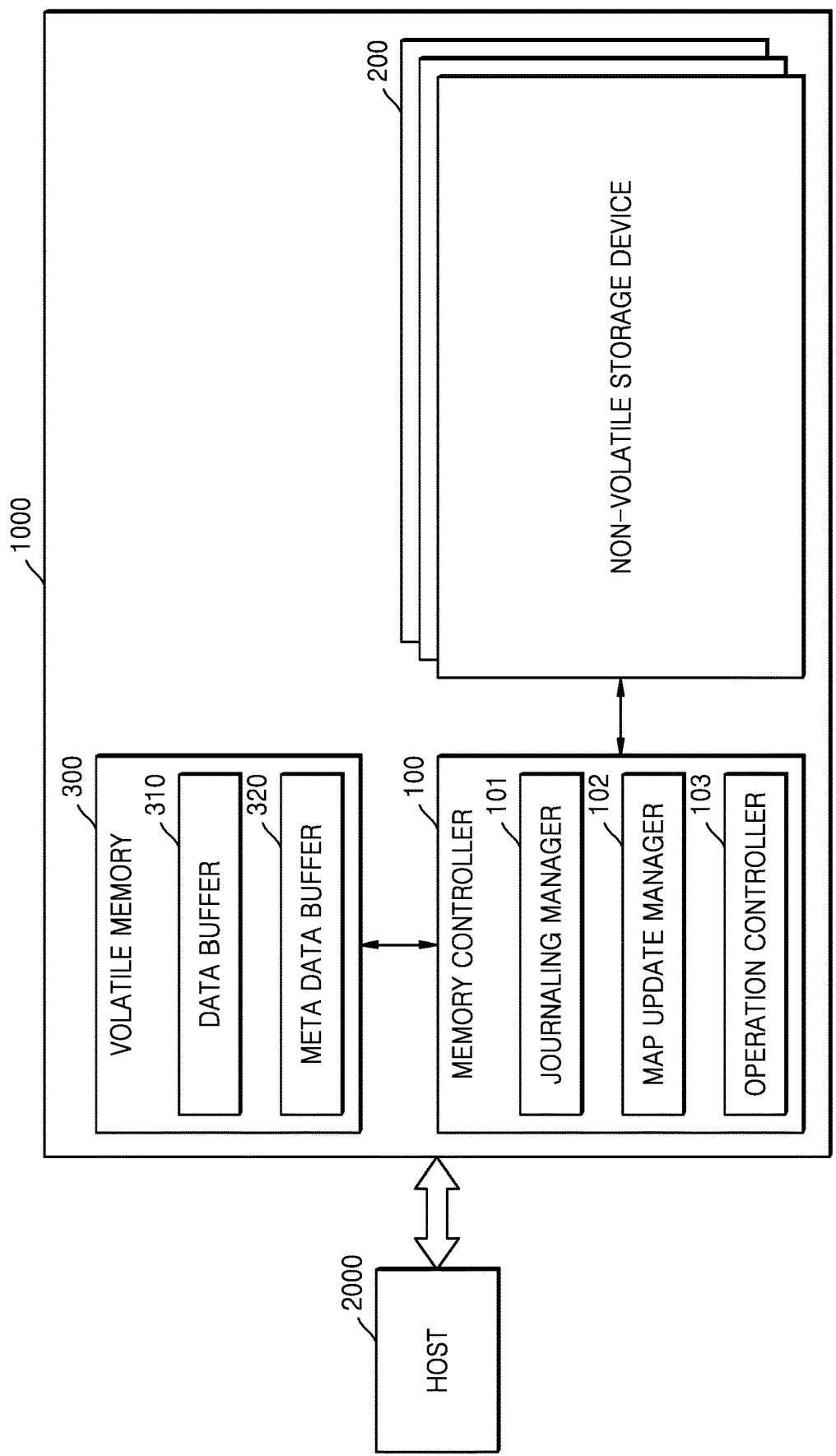
FIG. 1 is a diagram illustrating a storage system according to an embodiment of the present invention.

FIG. 1 is a diagram illustrating a storage system according to an embodiment of the present invention.

Referring to FIG. 1, a storage system may include a storage device 1000 and a host 2000.

The storage device 1000 may be a device that stores data according to the request of the host 2000. The storage device 1000 may include a memory controller 100, a non-volatile storage device 200, and a volatile memory 300.

The memory controller 100 may control the overall operation of the storage device 1000. When power is applied to the storage device 1000 from the outside, the memory controller 100 may execute a storage operating system stored in the non-volatile storage device 200.

The memory controller 100 may be implemented as a processor, and may operate based on hardware and firmware of the processor, in combination with software such as computer program code. The memory controller 100 implemented as a processor may perform error correction encoding of data provided to the non-volatile storage device 200, and generate data to which a parity bit is added. The parity bit (not shown) may be stored in the nonvolatile storage device 200. An error correction circuit may calculate an error correction code value of data to be programmed with the non-volatile storage device 200 in a program operation. The memory controller 100 may perform error correction decoding on data output from the non-volatile storage device 200, and in this case, correct the error using parity. The memory controller 100 may perform an error correction operation based on an error correction code value on data read from the non-volatile storage device 200 in a read operation. The memory controller 100 may perform an error correction operation of data restored from the non-volatile storage device 200 in a restoration operation of failed data.

The memory controller 100 may control the non-volatile storage device 200 or the volatile memory 300 to perform a program operation (or write operation), a read operation, and an erase operation, respectively, in response to the host 2000's write request, read request, and erase request.

During a program operation, the memory controller 100 may provide a program command, a physical address, and write data to the non-volatile storage device 200.

In an embodiment, during a program operation, the memory controller 100 may provide a program command and a physical address to the non-volatile storage device 200. Further, the memory controller 100 may provide a flush command and an address to the volatile memory 300 to flush data temporarily stored in the volatile memory 300 to the non-volatile storage device 200. When data temporarily stored in the volatile memory 300 is provided to the non-volatile storage device 200, the data temporarily stored in the volatile memory 300 may be erased.

During a read operation, the memory controller 100 may provide a read command and a physical address to the non-volatile storage device 200.

During an erase operation, the memory controller 100 may provide an erase command and a physical address to the non-volatile storage device 200.

The memory controller 100 may generate a command, an address, and data autonomously regardless of a request provided from the host 2000. For example, the memory controller 100 may generate a command, an address, and data for performing a background operation. The memory controller 100 may transmit autonomously generated commands, addresses, and data to the non-volatile storage device 200.

Background operations may include, for example, data rebuild, garbage collection, and the like. For example, garbage collection may be an operation of copying valid data among memory blocks to a free block and erasing invalid data.

In an embodiment, the memory controller 100 may logically control a plurality of non-volatile storage devices 200 operated as one non-volatile storage device 200.

In an embodiment, the memory controller 100 may allocate a data buffer 310 to the volatile memory 300 in response to write data that is not grouped into a transaction.

A transaction may be a unit of operation performed to change the state of a database, for example. An operation related to data in a database may mean an operation to access a database based on a structured query language (SQL) such as OPEN, SELECT, INSERT, DELETE, UPDATE, and CLOSE. Operations included in the transaction and related to data in the database may include a read operation of data, an addition operation of data, an operation of modifying data, an operation of deleting data, and an operation of changing data (modification operation).

When write data is grouped into transactions, this may mean that write data used for the same purpose is grouped into one transaction. For example, data for database modification may be grouped into any one transaction. When write data grouped into one transaction is transmitted from the host 2000 to the storage device 1000, there may only be a valid commit state or an abort state. In general, write data grouped into one transaction is meaningful only when it is in a valid commit state.

When write data is not grouped into transactions, this may mean that write data is individually transmitted and stored.

In an embodiment, when write data that is not grouped into a transaction is provided to the non-volatile storage device 200, the memory controller 100 may update metadata for the write data. The memory controller 100 may control the volatile memory 300 to store the updated metadata. The updated metadata may later be stored in the non-volatile storage device 200. During booting, the memory controller 100 may load metadata stored in the non-volatile storage device 200 into the volatile memory 300. This metadata, which is temporarily stored in the volatile memory 300, may be updated by the memory controller 100. The updated metadata may be then stored in the non-volatile storage device 200. In an embodiment, the metadata may be divided into representative metadata and related metadata. This is as shown, for example, in FIGS. 6 and 14.

In an embodiment, the memory controller 100 may journal update information on metadata. The memory controller 100 may control the non-volatile storage device 200 to store a journal log that is a metadata change point.

The memory controller 100 may include a journaling manager 101, a map update manager 102, and an operation controller 103. Each of the journaling manager 101, map update manager 102, and operation controller 103 may be operated using hardware and firmware, in combination with software such as computer program code. For example, the journaling manager 101, update manager 102, and operation controller 103 may be implemented as functional modules of the memory controller 100 implemented as a processor. Each functional module may comprise a separate processor (e.g., microprocessor or subprocessor), or some or all of the functional modules may be comprised of and share the hardware of the memory controller 100. Connections and interactions between the functional modules and the memory controller 100 may be hardwired and/or in the form of data. The functional modules may each correspond to a separate segment or segments of software (e.g., a subroutine) which configure the memory controller 100, and/or may correspond to segment(s) of software that also correspond to one or more other functional modules (e.g., the functional modules may share certain segment(s) of software or be embodied by the same segment(s) of software).

The journaling manager 101 may generate a journal log in response to an operation for the write data to be stored in the non-volatile storage device 200. The journal log may be data indicating update information on metadata of write data.

When the journaling manager 101 has stored a particular amount of journal data in the journal log in a memory area allocated by the non-volatile storage device 200, the journaling manager 101 may trigger the checkpoint. The particular amount may be determined by a predetermined checkpoint size. The checkpoint may be, for example, an operation for securing (e.g., making available) a memory area in which the journal log is stored in the non-volatile storage device 200 and storing updated metadata related to the journal log in the non-volatile storage device 200. For example, during the checkpoint, metadata currently stored in the volatile memory 300 may be stored in a new location in the non-volatile storage device 200, and journal logs associated with that metadata may be released (e.g., to allow the journal entries to be re-used for upcoming journal logs). The checkpoint may occur based on a predetermined schedule. For example, at particular time periods, a check may occur to determine if the journal log has reached the predetermined checkpoint size. If so, a checkpoint may occur. Alternatively, when a checkpoint size is reached, the non-volatile storage device 200 may notify the memory controller 100, or the memory controller 100 may be otherwise notified, which then initiates a checkpoint.

After the checkpoint is triggered, subsequent write data may be provided to the storage device 1000. In this case, the journaling manager 101 may generate a subsequent journal log in response to an operation for storing subsequent write data in the non-volatile storage device 200.

The map update manager 102 may acquire metadata temporarily stored in the volatile memory 300 and update the metadata based on the journal log. For example, metadata may be stored in volatile memory 300, and in response to a checkpoint, journal entries from the journal log may be used to update the metadata in the volatile memory.

The map update manager 102 may additionally update the metadata based on the subsequent journal log while the checkpoint is in progress. For example, the checkpoint may include a start and end instruction, and if metadata is added after the start instruction but before the end instruction, subsequent journal logs added after the start instruction may be used to update the metadata.

The map update manager 102 may update metadata according to whether a valid journal log is stored in the non-volatile storage device 200 when booting.

The operation controller 103 may generate a first operation command instructing performance of a normal operation and an address and provide the generated command and address to the non-volatile storage device 200. Here, the normal operation may be a write operation, a read operation, or an erase operation as described above, and the first operation command may be a program command, a read command, or a trim command.

The operation controller 103 may generate a second operation command instructing performance of a background operation and an address, and provide the second operation command and the address to the non-volatile storage device 200. The background operation may be, for example, garbage collection.

The operation controller 103 may generate a third operation command and an address, and provide the third operation command and the address to the non-volatile storage device 200. Here, the third operation command may be a write command or a read command. In an embodiment, the operation controller 103 may provide updated metadata, the write command, and the address to the volatile memory 300. In another embodiment, the operation controller 103 may provide a read command and an address to the volatile memory 300.

The operation controller 103 may generate a first journaling command instructing storage of the journal log and including a physical address of a memory area in which the journal log is to be stored in the non-volatile storage device 200. The operation controller 103 may provide a journal log, a first journaling command, and a physical address received from the journaling manager 101 to the non-volatile storage device 200.

The operation controller 103 may generate a second journaling command instructing deletion of the journal log and including a physical address of a memory area in which the journal log is stored in the non-volatile storage device 200. The operation controller 103 may provide the second journaling command and the physical address to the non-volatile storage device 200.

The non-volatile storage device 200 may operate in response to the control of the memory controller 100. Specifically, the non-volatile storage device 200 may receive a command and an address from the memory controller 100 and access a memory cell selected by the address among memory cells (not shown). The non-volatile storage device 200 may perform an operation indicated by a command on a memory cell selected by an address.

The non-volatile storage device may be, for example, a flash memory-based storage device. The flash memory may include, for example, a NAND flash memory, a vertical NAND flash memory, a NOR flash memory, and the like. The flash memory-based storage device may include, for example, a solid state drive (SSD).

The plurality of non-volatile storage devices 200 may operate in a redundant array of independent disks (RAID) or redundant array of inexpensive disks (RAID) method that logically operates as one memory device.

The volatile memory 300 may temporarily store data provided from the host 2000 or data provided from the non-volatile storage device 200 only while receiving power from the power source. The volatile memory 300 may be included in the memory controller 100 as a buffer memory or may be disposed outside the memory controller 100. For example, the volatile memory device may include DRAM, SRAM, or the like.

The volatile memory 300 may flush temporarily stored data to the non-volatile storage device 200 in response to the flush command of the memory controller 100.

The volatile memory 300 may include a data buffer 310 and a metadata buffer 320.

The data buffer 310 may temporarily store write data provided from the host 2000. Alternatively, the data buffer 310 may temporarily store read data provided from the non-volatile storage device 200.

The metadata buffer 320 may temporarily store metadata. In an embodiment, the metadata buffer 320 may temporarily store metadata provided from the non-volatile storage device 200 when booting.

The host 2000 may communicate with the storage device 1000 through an interface (not shown).

In an embodiment, the host 2000 may provide a write request, data, and a logical address for identifying data to the storage device 1000. The storage device 1000 may store write data including data and metadata provided by the host 2000 in the non-volatile storage device 200 in response to a write request provided by the host 2000, and provide a response indicating that the storage is completed to the host 2000.

Figure 2:
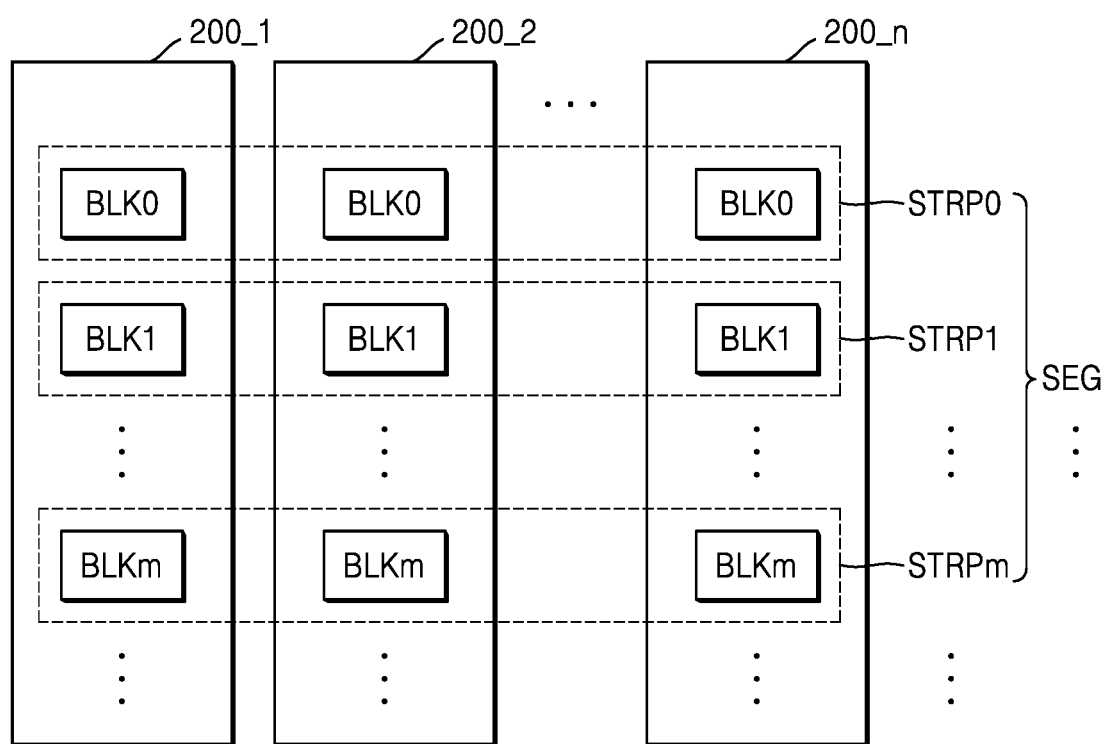
FIG. 2 is a diagram for explaining stripes and segments.

FIG. 2 is a diagram for explaining stripes and segments.

Referring to FIGS. 1 and 2, each of a plurality of non-volatile storage devices 200_1 to 200_n may communicate with the memory controller 100 through individual interfaces.

Each of the plurality of non-volatile storage devices 200_1 to 200_n may include a plurality of memory blocks BLK0 to BLKm. A memory block may be a user block or a system block. The user block may be a memory block that stores data provided from the host or data to be provided to the host. The system block may be a memory block that stores metadata or journal logs.

The plurality of non-volatile storage devices 200_1 to 200_n may logically operate as one memory device. The plurality of non-volatile storage devices 200_1 to 200_n logically operating as one memory device may be divided into a non-volatile storage device that operates as a first memory area in which write data is stored, and a non-volatile storage device that operates as a memory area in which metadata and journal logs are stored. For example, the first memory area may correspond to a plurality of memory blocks BLK0 to BLKm included in the first non-volatile storage device 200_1 to the n−1-th non-volatile storage device 200_n. For example, the n-th non-volatile storage device 200_n may operate as memory areas in which metadata and journal logs are stored. In this case, some of the memory blocks BLK0 to BLKm included in the n-th non-volatile storage device 200_n may correspond to the second memory area in which the journal log is stored, and the remaining memory blocks may correspond to a third memory area in which metadata is stored.

A stripe STRP may be a set of memory blocks selected from the plurality of non-volatile storage devices 200_1 to 200_n. For example, one stripe may be a logical group in which at least one memory block included in each nonvolatile memory device is operated as one memory block. For example, the 0-th stripe STRP0 may include the 0-th memory block BLK0 included in the first non-volatile storage device 200_1 to the 0-th memory block BLK0 included in the n-th non-volatile storage device 200_n. For example, the first stripe STRP1 may include the first memory block BLK1 included in the first non-volatile storage device 200_1 to the first memory block BLK1 included in the n-th non-volatile storage device 200_n. Similarly, the m-th stripe STRPm may include m-th memory blocks BLKm included in each of the plurality of non-volatile storage devices 200_1 to 200_n. Memory blocks included in one stripe are physically different memory blocks, but may logically operate like one memory block. Data may be simultaneously written to memory blocks included in one stripe.

One segment SEG may be a set of consecutive stripes. The number of stripes included in one segment SEG may be preset before the storage device 1000 is shipped. For example, one segment SEG may be logically composed of a 0-th stripe STRP0 to an m-th stripe STRPm.

Figure 3:
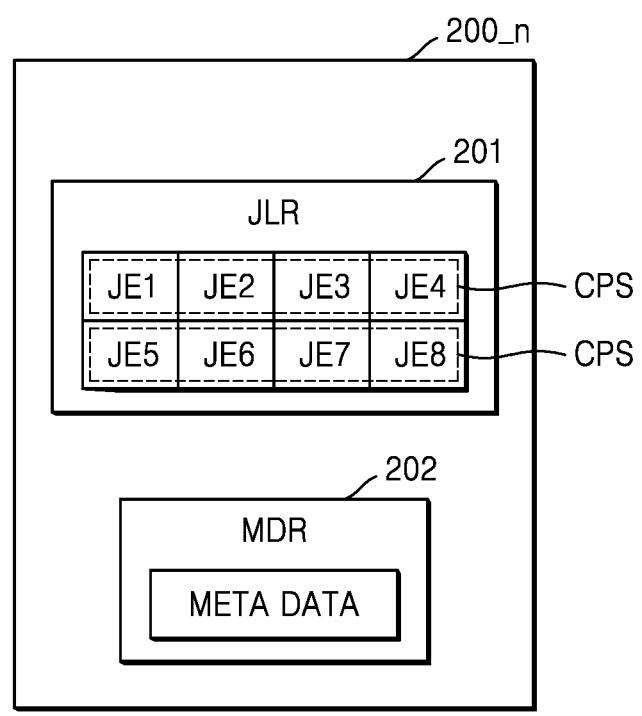
FIG. 3 is a diagram for describing a journal log area and a metadata area.

FIG. 3 is a diagram for describing a journal log area and a metadata area.

In describing the embodiment illustrated in FIG. 3, it is assumed that the n-th non-volatile storage device 200_n is operated as memory areas in which metadata and journal logs are stored.

Referring to FIGS. 2 and 3, the second memory area 201 of the n-th non-volatile storage device 200_n may be a memory area in which a journal log is stored, and may be described as a journal log area. The second memory area 201 may correspond to some of the plurality of memory blocks BLK0 to BLKm included in the n-th non-volatile storage device 200_n. The second memory area 201 may include a plurality of journal entries JE1 to JE8.

The plurality of journal entries JE1 to JE8 may be divided by a checkpoint size CPS, which is a unit for performing a checkpoint operation. For example, if the checkpoint size CPS consists of 4 journal entries, one checkpoint size CPS may be composed of first to fourth journal entries JE1 to JE4 or fifth to eighth journal entries JE5 to JE8. Journal logs satisfying the checkpoint size CPS may be defined as a journal log group.

The third memory area 202 of the n-th non-volatile storage device 200_n may be a memory area in which metadata META DATA is stored. The third memory area 202 may correspond to the remaining memory blocks other than the second memory area 201 among the plurality of memory blocks BLK0 to BLKm included in the n-th non-volatile storage device 200_n. Ordinal numbers such as "first," "second," "third," etc. may be used simply as labels of certain elements, steps, etc., to distinguish such elements, steps, etc. from one another. Terms that are not described using "first," "second," etc., in the specification, may still be referred to as "first" or "second" in a claim. In addition, a term that is referenced with a particular ordinal number (e.g., "first" in a particular claim) may be described elsewhere with a different ordinal number (e.g., "second" in the specification or another claim).

Figure 4:
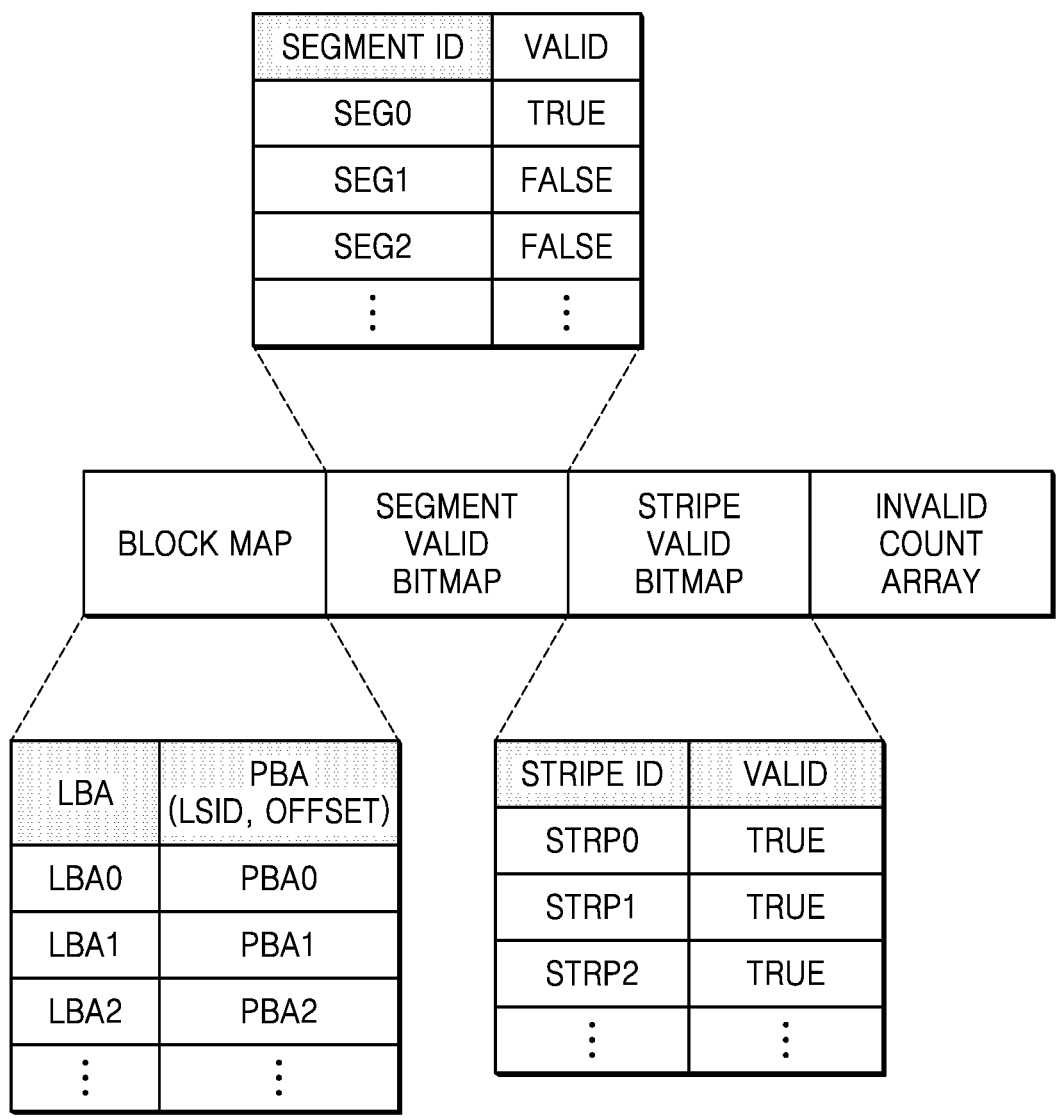
FIG. 4 is a diagram for describing metadata according to an embodiment of the present invention.

FIG. 4 is a diagram for describing metadata according to an embodiment of the present invention.

Referring to FIG. 4, the metadata may include map data BLOCK MAP, first allocation data SEGMENT VALID BITMAP, second allocation data STRIPE VALID BITMAP, and invalid count data INVALID COUNT ARRAY.

The map data BLOCK MAP may be data indicating mapping information between the logical address LBA and the physical address PBA. The map data BLOCK MAP may be implemented as a logical-physical table. The physical address PBA may be an address of a selected memory block among the plurality of memory blocks BLK0 to BLKm included in the non-volatile storage device 200, and may also be described as a logical block address. The physical address PBA may be composed of stripe information LSID and offset information OFFSET, and may also be described as a physical block address. The stripe information LSID may be information indicating a stripe number. For example, if the value of the stripe information LSID is 0, this may indicate the 0-th stripe STRP0. The offset information OFFSET may be information indicating the number of a memory block in which write data is last stored among memory blocks included in the stripe. For example, if the value of stripe information LSID is 0 and the value of offset information OFFSET is 0, the physical address PBA may represent the 0-th memory block BLK0 included in the first non-volatile storage device 200_1.

The first allocation data SEGMENT VALID BITMAP may be data indicating whether a plurality of segments are allocated. In an embodiment, the first allocation data SEGMENT VALID BITMAP may be implemented as a bitmap marked as TRUE or FALSE for each segment SEGMENT ID. In this case, TRUE may indicate that a corresponding segment is allocated, but it is not limited thereto.

The second allocation data STRIPE VALID BITMAP may be data indicating whether to allocate a plurality of stripes included in the allocated segment. In an embodiment, the second allocation data STRIPE VALID BITMAP may be implemented as a bitmap marked as TRUE or FALSE for each stripe STRIPE ID. In this case, TRUE may indicate that a corresponding segment is allocated, but it is not limited thereto.

The invalid count data INVALID COUNT ARRAY may be data indicating an invalid count. The invalid count may be the number of times that data stored in the non-volatile storage device 200 is processed as invalid.

As the map data BLOCK MAP changes, because the first allocation data SEGMENT VALID BITMAP, the second allocation data STRIPE VALID BITMAP, and the invalid count data INVALID COUNT ARRAY may be changed, the map data BLOCK MAP is closely related to the first allocation data SEGMENT VALID BITMAP, the second allocation data STRIPE VALID BITMAP, and the invalid count data INVALID COUNT ARRAY. The map data BLOCK MAP may correspond to representative metadata as described above with reference to FIG. 1. The associated metadata may include first allocation data SEGMENT VALID BITMAP, second allocation data STRIPE VALID BITMAP, and invalid count data INVALID COUNT ARRAY.

Figure 5:
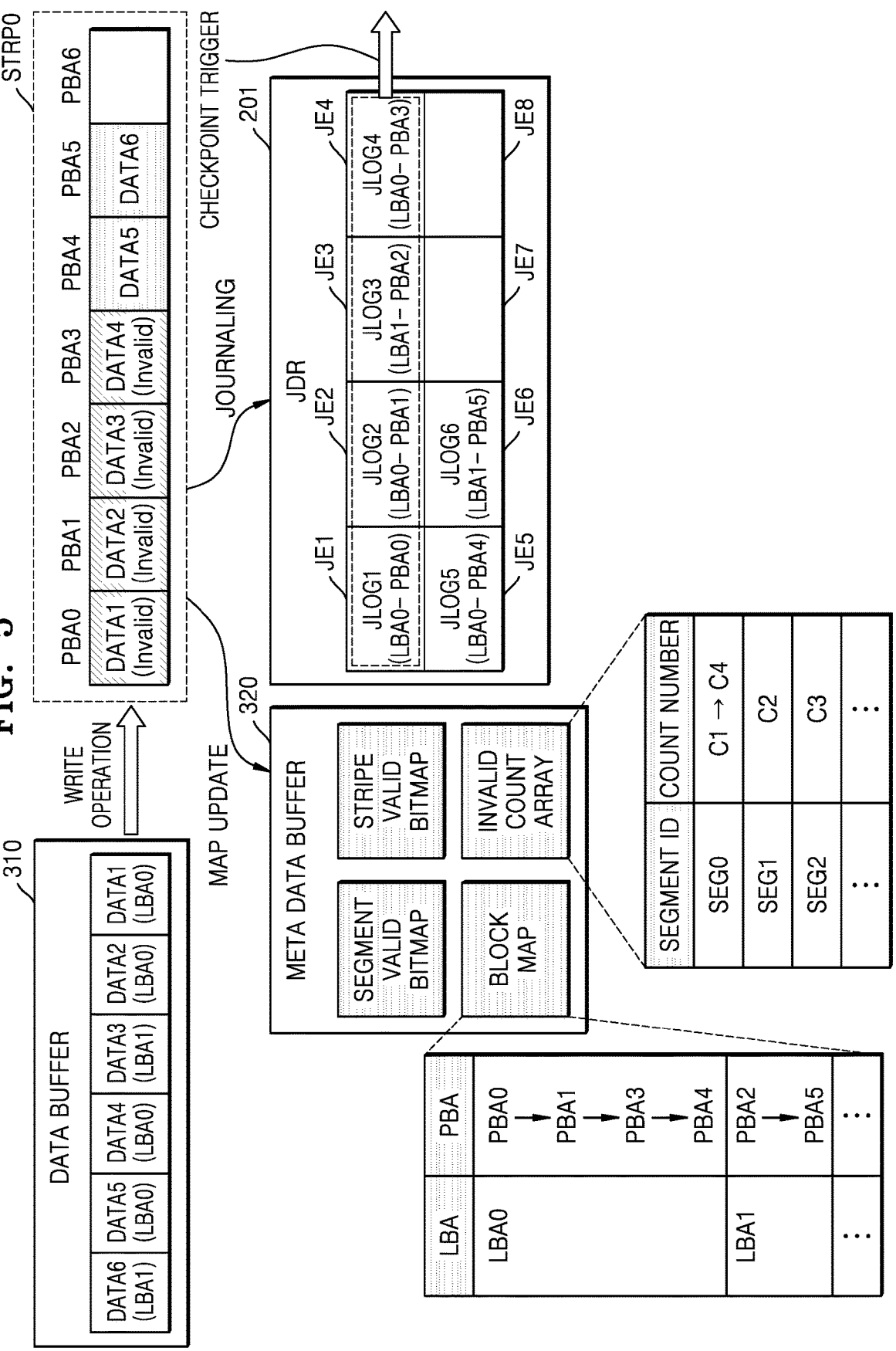
FIG. 5 is a diagram for describing a write operation, a journaling operation, and a map update operation according to an embodiment of the present invention.

FIG. 5 is a diagram for describing a write operation, a journaling operation, and a map update operation according to an embodiment of the present invention.

In describing the embodiment shown in FIG. 5, it is assumed that the pieces of write data DATA1, DATA2, DATA3, DATA4, DATA5, and DATA6 provided from the host 2000 are pieces of write data that are not grouped into a transaction. In addition, it is assumed that the memory blocks having the 0-th physical address PBA0 to the sixth physical address PBA6 are included in the 0-th stripe STRP0 of the above-described first memory area.

Referring to FIGS. 1 and 5, the memory controller 100 may temporarily store write data DATA1 corresponding to the 0-th logical address LBA0 in the data buffer 310. The memory controller 100 may convert the 0-th logical address LBA0 to the 0-th physical address PBA0. When no data is stored in the memory block with the 0-th physical address PBA0, the memory controller 100 may display the allocation information VALID of the 0-th stripe STRP0 as TRUE, and allocate a memory block by generating offset information OFFSET indicating a value of 0. At this time, if the number of the stripe is the first stripe in each segment (e.g., the 0-th stripe STRP0 included in the 0-th segment SEG0), the memory controller 100 may display allocation information VALID of a corresponding segment as TRUE. The memory controller 100 may provide write data DATA1, a 0-th physical address PBA0, and a write command to the non-volatile storage device 200. The memory controller 100 may update metadata temporarily stored in the metadata buffer 320 by providing modified metadata, an address, and a write command to the volatile memory 300. In this case, the modified metadata may include the map data BLOCK MAP obtained by reflecting mapping information between the 0-th logical address LBA0 and the 0-th physical address PBA0, the first allocation data SEGMENT VALID BITMAP obtained by reflecting the changed allocation information VALID of the 0-th segment SEG0, and the second allocation data STRIPE VALID BITMAP obtained by reflecting the allocation information VALID of the changed 0-th stripe STRP0. The memory controller 100 may generate the journal log JLOG1 in response to the write data DATA1 being stored in the first memory area. The memory controller 100 may provide the journal log JLOG1, a physical address of the second memory area 201 in which the journal log JLOG1 is to be stored, and a first journaling command to the non-volatile storage device 200. The journal log JLOG1 may be stored in the first journal entry JE1 of the second memory area 201 and may indicate mapping information between the 0-th logical address LBA0 and the 0-th physical address PBA0.

Write data DATA2 corresponding to the 0-th logical address LBA0 may be temporarily stored in the data buffer 310. The 0-th logical address LBA0 may be converted to a physical address. Because overwriting may not be possible in the non-volatile storage device 200, the physical address converted from the 0-th logical address LBA0 may be the first physical address PBA1. When no data is stored in the memory block with the first physical address PBA1, the memory controller 100 may allocate the memory block having the first physical address PBA1 by changing the value of the offset information OFFSET from 0 to 1. The non-volatile storage device 200 may invalidate the write data DATA1 stored in the memory block having the 0-th physical address PBA0, and store the write data DATA2 in the memory block having the first physical address PBA1. The memory controller 100 may change the invalid count of the 0-th segment SEG0 including the 0-th stripe STP0 from C1 to C1+1. C1 may be a natural number. The memory controller 100 may update metadata temporarily stored in the metadata buffer 320. The modified metadata may include, by the memory controller 100, map data BLOCK MAP obtained by reflecting mapping information between the 0-th logical address LBA0 and the first physical address PBA1, and invalid count data INVALID COUNT ARRAY in which the invalid count of the 0-th segment SEG0 is changed from C1 to C1+1. The journal log JLOG2 may be stored in the second journal entry JE2 and may indicate mapping information between the 0-th logical address LBA0 and the first physical address PBA1.

Write data DATA3 corresponding to the first logical address LBA1 may be temporarily stored in the data buffer 310. The first logical address LBA1 may be converted to the second physical address PBA2. Because no data is stored in the memory block with the second physical address PBA2, the memory controller 100 may allocate a memory block having the second physical address PBA2. The write data DATA3 may be stored in the memory block having the second physical address PBA2. The modified metadata may include map data BLOCK MAP obtained by reflecting mapping information between the first logical address LBA1 and the second physical address PBA2. The journal log JLOG3 may be stored in the third journal entry JE3 and may indicate mapping information between the first logical address LBA1 and the second physical address PBA2.

Write data DATA4 corresponding to the 0-th logical address LBA0 may be temporarily stored in the data buffer 310. The 0-th logical address LBA0 may be converted to the third physical address PBA3, and a memory block having the third physical address PBA3 may be allocated. The write data DATA2 may be processed as invalid, and the write data DATA4 may be stored in the memory block having the third physical address PBA3. The invalid count of the 0-th segment SEG0 including the 0-th stripe STRP0 may be changed from C1+1 to C1+2. The modified metadata may include map data BLOCK MAP and invalid count data INVALID COUNT ARRAY. The journal log JLOG4 may be stored in the fourth journal entry JE4 and may indicate mapping information between the 0-th logical address LBA0 and the third physical address PBA3.

When the first to fourth journal logs JLOG1 to JLOG4 are stored in the first to fourth journal entries JE1 to JE4, a checkpoint event may occur. The checkpoint event may mean that a checkpoint is triggered (checkpoint trigger) by satisfying the above-described checkpoint size CPS. The first to fourth journal logs JLOG1 to JLOG4 may be included in the first journal log group. The first metadata updated based on the first journal log group may include mapping information between the 0-th logical address LBA0 and the third physical address PBA3, map data BLOCK MAP including the mapping information between the first logical address LBA1 and the second physical address PBA2, the first allocation data SEGMENT VALID BITMAP in which the allocation information VALID of the 0-th segment SEG0 is marked as TRUE, the second allocation data STRIPE VALID BITMAP in which the allocation information VALID of the 0-th stripe STRP0 is marked as TRUE, and invalid count data INVALID COUNT ARRAY in which the invalid count of the 0-th segment SEG0 is changed.

After the checkpoint is triggered (e.g., while the checkpoint tasks are being carried out), write data DATA5 corresponding to the 0-th logical address LBA0 is temporarily stored in the data buffer 310, the 0-th logical address LBA0 is converted to the fourth physical address PBA4, and a memory block having the fourth physical address PBA4 may be allocated. The write data DATA4 is processed as invalid, and the invalid count of the 0-th segment SEG0 including the 0-th stripe STP0 may be changed from C1+2 to C1+3. The write data DATA5 may be stored in the memory block having the fourth physical address PBA4. The modified metadata may include map data BLOCK MAP and invalid count data INVALID COUNT ARRAY. The journal log JLOG5 may be stored in the fifth journal entry JE5 and may indicate mapping information between the 0-th logical address LBA0 and the fourth physical address PBA4.

The first logical address LBA1 may be converted to the fifth physical address PBA5, and a memory block having the fifth physical address PBA5 may be allocated. The write data DATA3 is processed as invalid, and the invalid count of the 0-th segment SEG0 including the 0-th stripe STP0 may be changed from C1+3 to C1+4. As the write data DATA6 is stored in the memory block having the fifth physical address PBA5, the metadata may be updated. The journal log JLOG6 may be stored in the sixth journal entry JE6 and may indicate mapping information between the first logical address LBA1 and the fifth physical address PBA5.

The second journal log group may include journal logs other than the first journal log group among journal logs JLOG1 to JLOG6 stored in the second memory area 201. For example, the fifth journal log JLOG5 and the sixth journal log JLOG6 may be included in the second journal log group. The second metadata updated based on the second journal log group may include mapping information between the 0-th logical address LBA0 and the fourth physical address PBA4, map data BLOCK MAP including the mapping information between the first logical address LBA1 and the fifth physical address PBA5, the first allocation data SEGMENT VALID BITMAP in which the allocation information VALID of the 0-th segment SEG0 is marked as TRUE, the second allocation data STRIPE VALID BITMAP in which the allocation information VALID of the 0-th stripe STRP0 is marked as TRUE, and invalid count data INVALID COUNT ARRAY in which the invalid count of the 0-th segment SEG0 is C4. C4 is a natural number greater than C1, and may be, for example, C1+4.

The memory controller 100 may control the non-volatile storage device 200 to store parity (not shown) corresponding to each piece of write data together with each piece of write data.

According to the above, by journaling the update information of the map data corresponding to the representative metadata, a decrease in performance due to journaling may be minimized, and power unnecessarily wasted in a storage device may be reduced.

Figure 6:
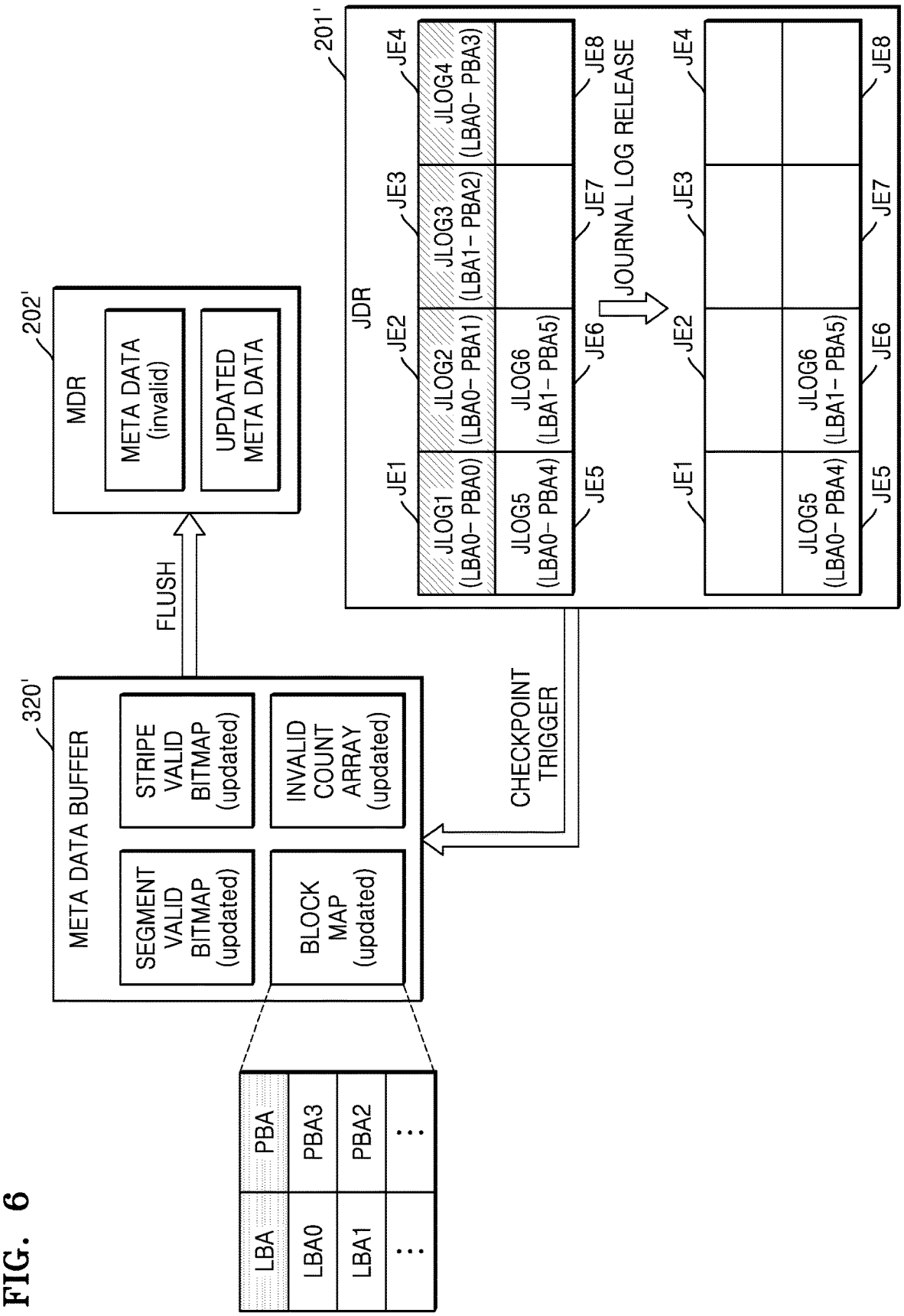
FIG. 6 is a diagram for explaining a checkpoint according to a comparative example.

FIG. 6 is a diagram for explaining a checkpoint according to a comparative example.

Referring to FIG. 6, write data according to the comparative example is write data grouped into transactions. When the first to fourth journal logs JLOG1 to JLOG4 included in the first journal log group are stored in the first to fourth journal entries JE1 to JE4, a checkpoint is triggered (CHECKPOINT TRIGGER). When the checkpoint is triggered, the metadata according to the comparative example is updated based on only the first journal log group to ensure the consistency of the data. For example, the map data BLOCK MAP included in the first metadata includes mapping information between the 0-th logical address LBA0 and the third physical address PBA3, and mapping information between the first logical address LBA1 and the second physical address PBA2. After the checkpoint is triggered, the fifth journal log JLOG5 and the sixth journal log JLOG6 are stored in the second memory area 201'.

When the checkpoint is triggered, the metadata stored in a metadata buffer 320' is flushed to the nonvolatile memory device according to the comparative example. Further, the first to fourth journal logs JLOG1 to JLOG4 stored in a second memory area 201' are deleted (RELEASE).

Figure 7:
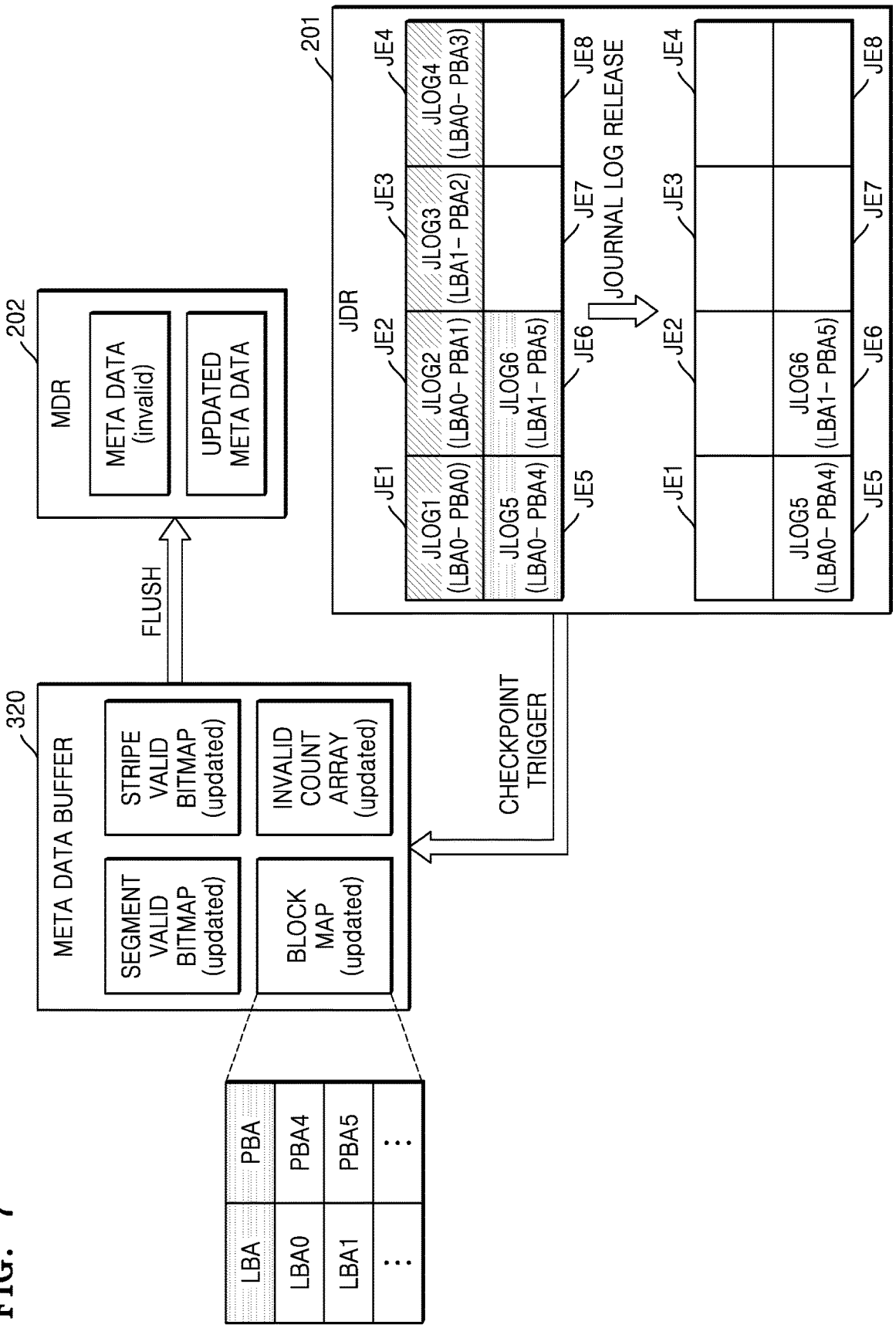
FIG. 7 is a diagram for explaining a checkpoint according to an embodiment of the present invention.

FIG. 7 is a diagram for explaining a checkpoint according to an embodiment of the present invention.

Referring to FIG. 7, a storage space of the second memory area 201 may correspond to a plurality of journal entries JE1 to JE8. When the first to fourth journal logs JLOG1 to JLOG4 included in the first journal log group are stored in the first to fourth journal entries JE1 to JE4, a checkpoint is triggered (CHECKPOINT TRIGGER). When the fifth journal log JLOG5 and the sixth journal log JLOG6 are stored in the second memory area 201 after the checkpoint is triggered, the memory controller 100 may update metadata based on the fifth journal log JLOG5 and the sixth journal log JLOG6. As a result, the metadata temporarily stored in the metadata buffer 320 (e.g., of the volatile memory 300) may be the above-described second metadata.

In an embodiment, when a checkpoint is triggered, the memory controller 100 may provide a flush command to the volatile memory 300. The flush command may be a command to the volatile memory 300 instructing the volatile memory 300 to flush (e.g., write) the second metadata to the non-volatile storage device 200. Updated map data BLOCK MAP, updated first allocation data SEGMENT VALID BITMAP, updated second allocation data STRIPE VALID BITMAP, and updated invalid count data INVALID COUNT ARRAY may be provided to the non-volatile storage device 200. In the third memory area 202, the metadata META DATA may be processed as invalid, and the updated metadata UPDATED META DATA may be stored.

In one embodiment, after the updated metadata UPDATED META DATA is stored in the third memory area 202, the memory controller 100 may provide a second journaling command to the non-volatile storage device 200 instructing the non-volatile storage device 200 to release the journal log. The non-volatile storage device 200 may delete the journal logs JLOG1 to JLOG4 in response to the second journaling command.

Figure 8:
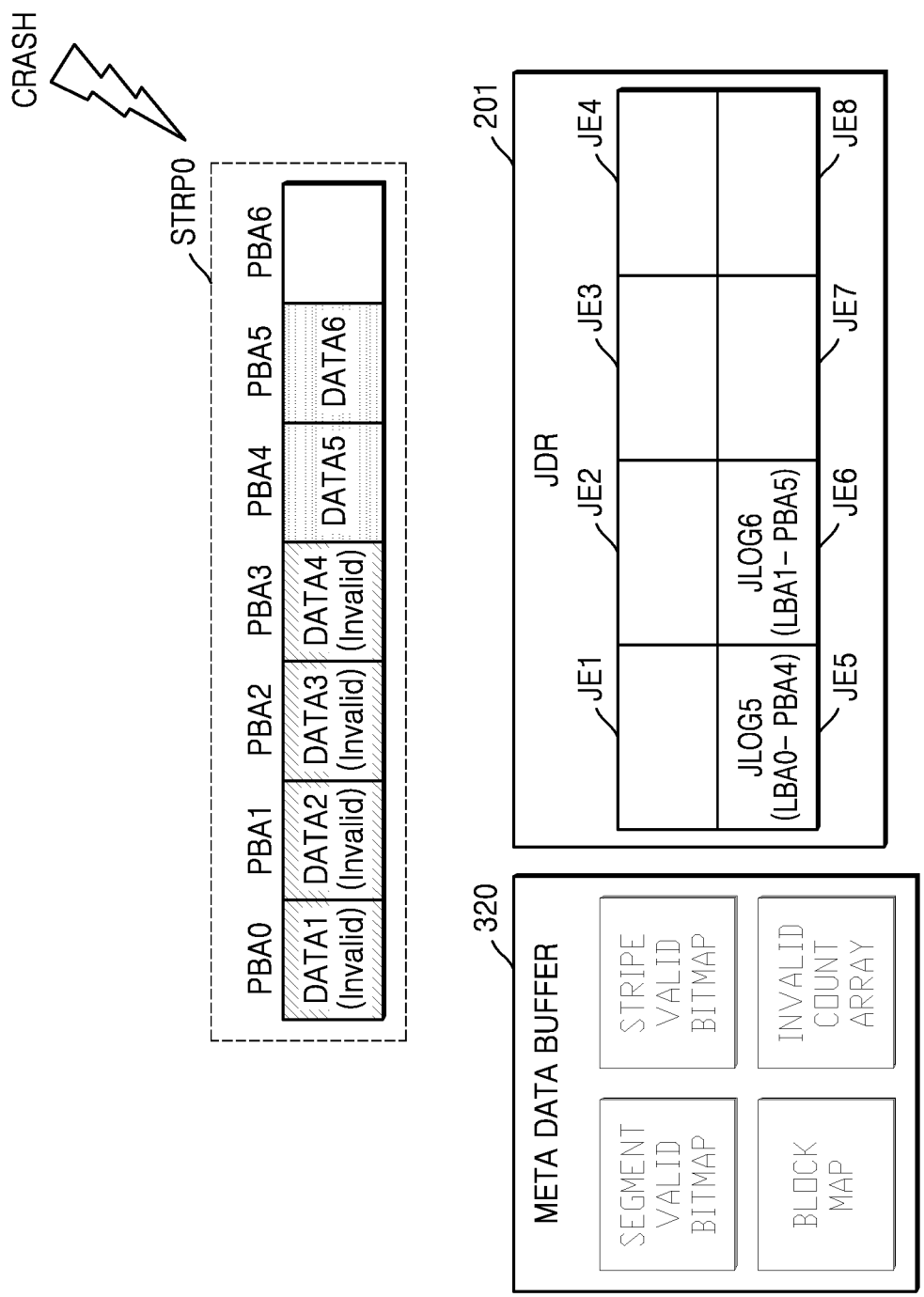
FIG. 8 is a diagram for describing a state of a storage device according to a crush occurrence.

FIG. 8 is a diagram for describing a state of a storage device according to a crash occurrence.

Referring to FIG. 8, as pieces of write data DATA1 to DATA6 are stored in the first memory area, metadata META DATA may be updated. Journal logs JLOG1 to JLOG6 may be sequentially stored in journal entries JE1 to JE6. Journal logs JLOG1 to JLOG4 satisfying the checkpoint size CPS may be deleted.

A crash CRASH may occur during a write operation or a checkpoint operation. A crash CRASH may mean an event, such as sudden power off in which power supplied to the storage device 1000 from the outside is unexpectedly cut off, kernel panic that occurs when the operating system detects a fatal internal error and a safe rebuild is not possible, and the like. When a crash CRASH occurs, data temporarily stored in the volatile memory 300 may be deleted or damaged, but the data DATA1 to DATA6 stored in the non-volatile storage device 200 may not be erased.

When a crash CRASH occurs, updated metadata may not be stored in the non-volatile storage device 200. In this case, the performance of an operation performed by the non-volatile storage device 200 may be reduced.

In order to address this problem, a rebuild operation of rebuilding updated metadata after a crash CRASH occurs can be performed.

Figure 9:
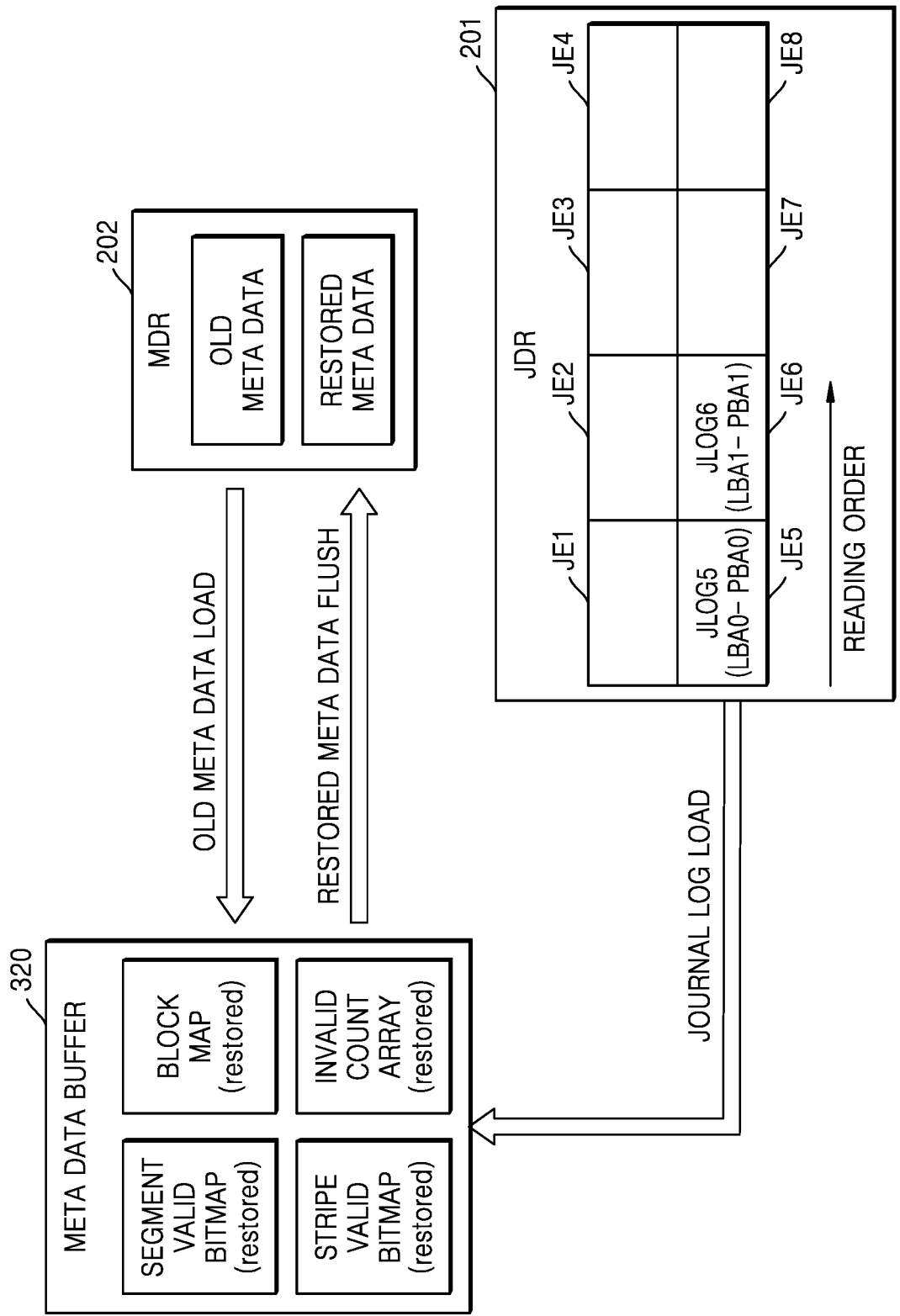
FIG. 9 is a diagram for describing a rebuild operation according to an embodiment of the present invention.

FIG. 9 is a diagram for describing a rebuild operation according to an embodiment of the present invention.

Referring to FIG. 9, when power is supplied from the outside after a crash CRASH occurs, the memory controller 100 may control the non-volatile storage device 200 to read journal logs JLOG5 and JLOG6 stored in the second memory area 201 and old metadata OLD META DATA stored in the third memory area 202. Old metadata OLD META DATA may be metadata stored in the non-volatile storage device 200 before power is supplied to the storage device 1000. In one embodiment, the old metadata OLD METADATA includes data related to previously released journal logs JLOG1 through JLOG4. In an embodiment, the journal logs JLOG5 and JLOG6 stored in the second memory area 201 may be sequentially read from the order in which the entry number of the journal entry is low.

Journal logs JLOG5 and JLOG6 may be sequentially loaded into the metadata buffer 320. Old metadata OLD META DATA may also be loaded into the metadata buffer 320. The memory controller 100 may rebuild metadata by updating old metadata OLD META DATA based on the journal logs JLOG5 and JLOG6. The rebuilt metadata RESTORED META DATA may include rebuilt map data BLOCK MAP, rebuilt first allocation data SEGMENT VALID BITMAP, rebuilt second allocation data STRIPE VALID BITMAP, and rebuilt invalid count data INVALID COUNT ARRAY.

The memory controller 100 may control the volatile memory 300 to flush the rebuilt metadata RESTORED META DATA to the non-volatile storage device 200. In the third memory area 202, old metadata OLD META DATA is processed as invalid, and rebuilt metadata RESTORED META DATA is stored.

Hereinafter, an operation of rebuilding metadata based on a journal log will be described in detail.

Figure 10:
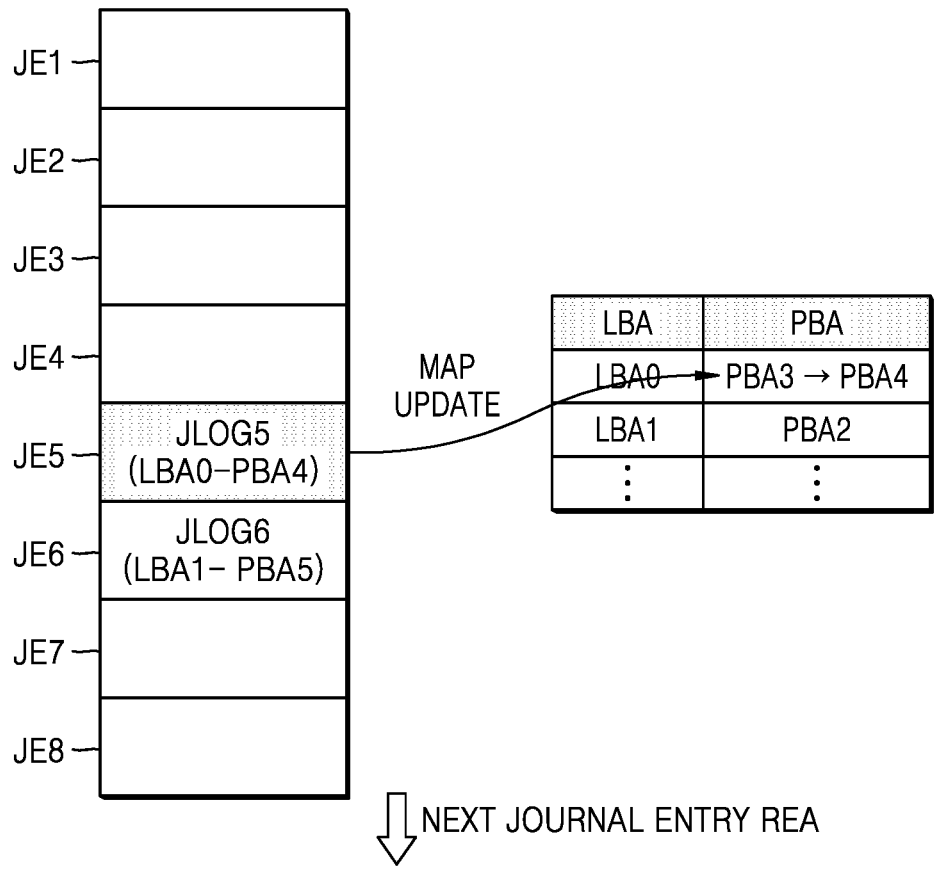
FIG. 10 is a diagram for describing an operation of rebuilding map update, allocation data, and invalid count data based on a journal log.
Figure 10:
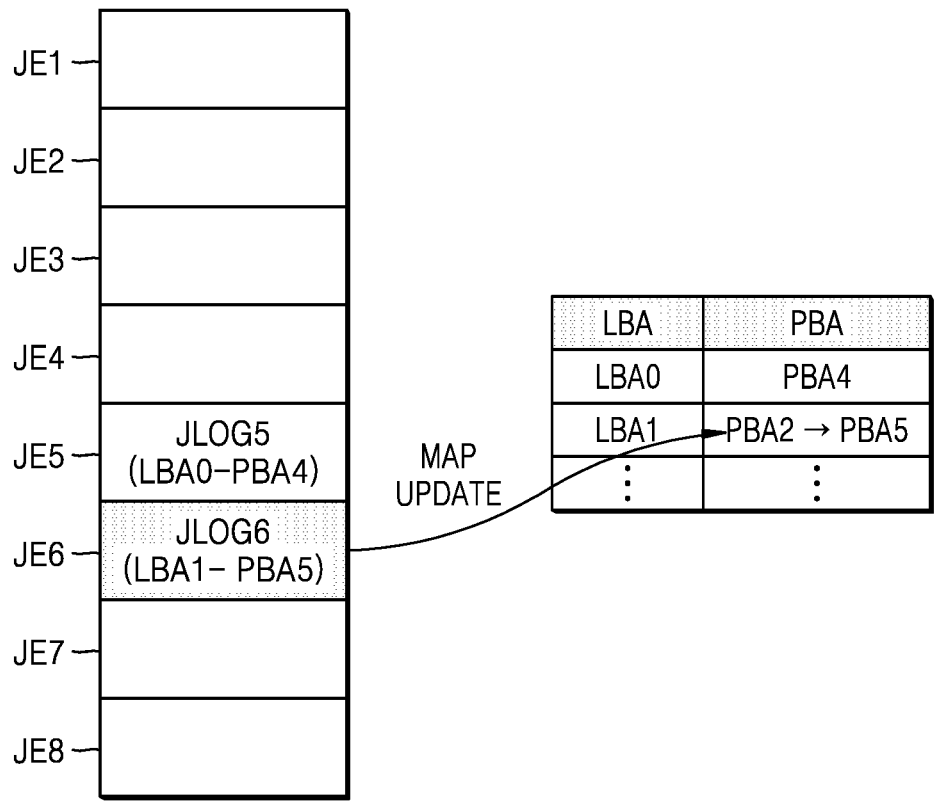

FIG. 10 is a diagram for describing an operation of rebuilding map update, allocation data, and invalid count data based on a journal log.

In describing the embodiment shown in FIG. 10, it is assumed that the first journal entry JE1 to the fourth journal entry JE4 are empty according to a checkpoint performed before power is supplied. Also, it is assumed that the 0-th logical address LBA0 of the logical-physical table is mapped to the third physical address PBA3 before the rebuild operation and the first logical address LBA1 is mapped to the second physical address PBA2 before the rebuild operation.

The journal log JLOG5 stored in the fifth journal entry JE5 may indicate mapping information between the 0-th logical address LBA0 and the fourth physical address PBA4. The memory controller 100 may generate map data BLOCK MAP obtained by reflecting first mapping information between the 0-th logical address LBA0 and the fourth physical address PBA4 by using the journal log JLOG5. In the logical-physical table, the third physical address PBA3 mapped to the 0-th logical address LBA0 may be changed to the fourth physical address PBA4.

The journal log JLOG6 stored in the sixth journal entry JE6 may indicate mapping information between the first logical address LBA1 and the fifth physical address PBA5. The memory controller 100 may generate map data BLOCK MAP in which mapping information between the first logical address LBA1 and the fifth physical address PBA5 is additionally reflected using the journal log JLOG6.

The rebuild operation according to the embodiment illustrated in FIG. 10 is performed on the assumption that the first journal entry JE1 to the fourth journal entry JE4 are emptied by a checkpoint performed before power is supplied. However, the present invention is not limited thereto, and metadata may be rebuilt even if the journal logs JLOG1 to JLOG4 are stored in the first journal entry JE1 to the fourth journal entry JE4. In this case, because the mapping operation for the same logical address is performed more than once, the memory controller 100 first may generate first map data based on the stored first journal log, and change the first map data to the second map data based on the second journal log stored after the first journal log. Also, the memory controller 100 may update the invalid count data by increasing the invalid count of the memory block in response to generating the second map data.

As described above, even when an unexpected event occurs, consistency between metadata and a journal log may be guaranteed, and the reliability of a storage device may be improved.

Also, as described above, after the crash occurs, by rebuilding not only the map data but also the metadata related to the data only with the journal log for the map data, unnecessarily wasted power may be reduced.

Figure 11:
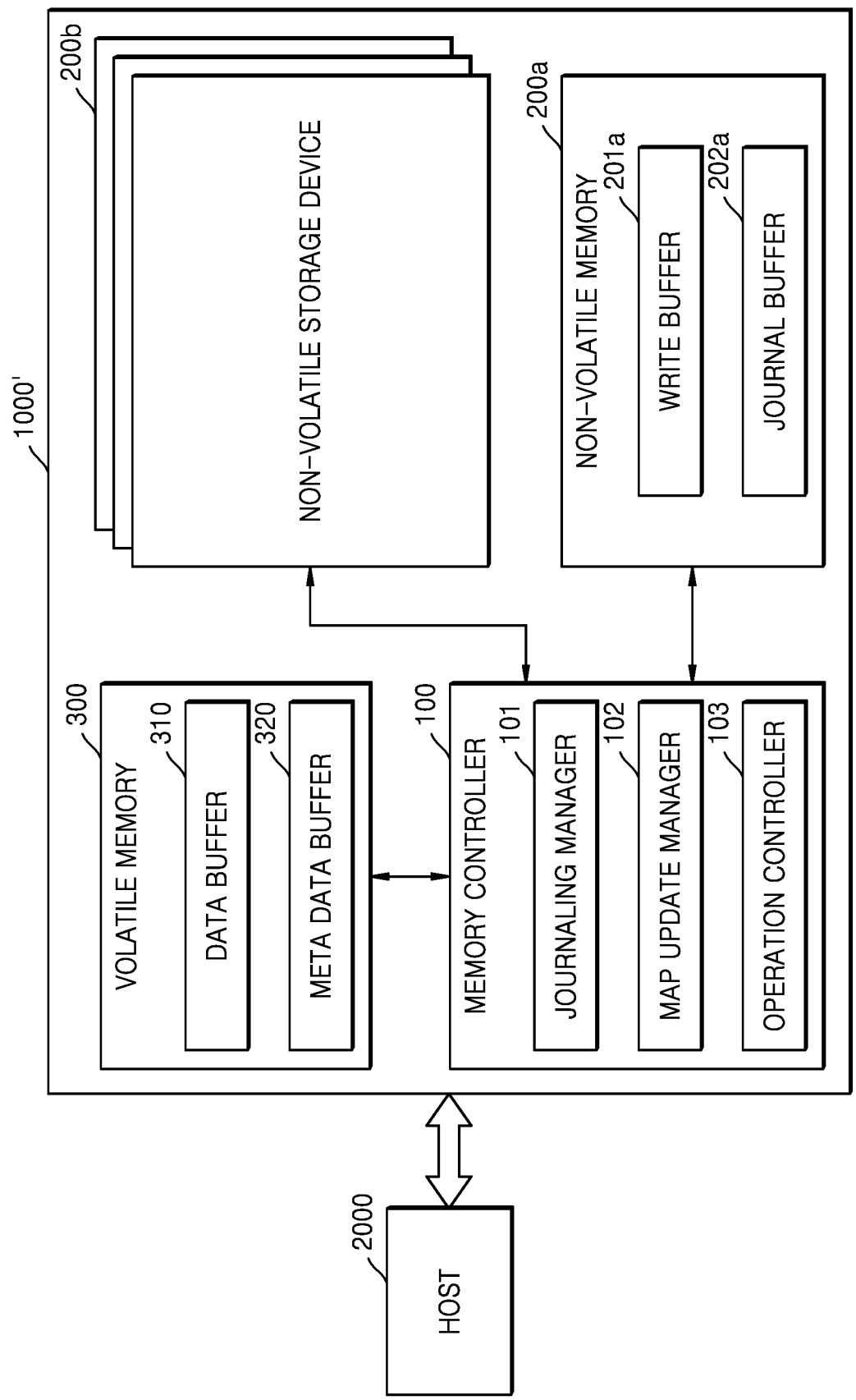
FIG. 11 is a diagram illustrating a storage system according to another embodiment of the present invention.

FIG. 11 is a diagram illustrating a storage system according to another embodiment of the present invention.

Referring to FIG. 11, a storage system according to another embodiment of the present invention may include a storage device 1000' and a host 2000.

The storage device 1000' may include a memory controller 100, a non-volatile memory device 200a, a non-volatile storage device 200b, and a volatile memory 300.

The memory controller 100 and the volatile memory 300 may perform all of the operations described above with reference to FIG. 1.

In another embodiment, the memory controller 100 may generate a journal log in response to the write data being stored in the nonvolatile memory device 200a, control the nonvolatile memory device 200a to store the journal log, and update metadata temporarily stored in the metadata buffer 320 based on the journal log.

In another embodiment, when the size of the journal log stored in the non-volatile memory device 200a satisfies the checkpoint size CPS, a checkpoint event may occur. The metadata updated until the checkpoint event occurs may be the above-mentioned first metadata. Meanwhile, after the checkpoint is triggered, the memory controller 100 may generate a subsequent journal log in response to the subsequent write data being stored in the nonvolatile memory device 200a. The memory controller 100 may control the volatile memory 300 to update the first metadata to the second metadata based on the subsequent journal log and to store the second metadata.

The non-volatile memory device 200a may include a write buffer 201a and a journal buffer 202a. For example, the non-volatile memory device 200a may be implemented as non-volatile random access memory (NVRAM).

The write buffer 201a may store write data that is not grouped into transactions in the same manner as the first memory area of the non-volatile storage device 200 illustrated in FIG. 1. However, the write buffer 201a may be a physical memory area, and the first memory area of the non-volatile storage device 200 may be a logically implemented area. The write buffer 201a may include a plurality of stripes.

In another embodiment, the operation controller 103 may control the non-volatile memory device 200a to store write data that is not grouped into a transaction in the write buffer 201a.

The journal buffer 202a may store a journal log in the same manner as the second memory area 201 of the non-volatile storage device 200 illustrated in FIG. 1. However, the journal buffer 202a may be a physical memory area, and the second memory area 201 of the non-volatile storage device 200 may be a logically implemented area. The journal buffer 202a may include a plurality of journal entries.

In another embodiment, the operation controller 103 may control the non-volatile memory device 200a to store the journal log in the journal buffer 202a.

The non-volatile storage device 200b may store write data and metadata in the same manner as the non-volatile storage device 200 illustrated in FIG. 1.

In another embodiment, the non-volatile storage device 200b may be logically operated as one storage device, and may include a first memory block group and a second memory block group. The first memory block group may be a set of memory blocks in which write data is stored. The second memory block group may be a set of memory blocks in which metadata is stored. The non-volatile storage device 200b may include a plurality of segments, and each segment may include a plurality of stripes.

In another embodiment, the operation controller 103 may control the non-volatile memory device 200a and the non-volatile storage device 200b to flush the write data stored in the write buffer 201a to the non-volatile storage device 200b.

In another embodiment, the operation controller 103 may control the volatile memory 300 to flush metadata temporarily stored in the metadata buffer 320 into the non-volatile storage device 200b in response to the journal log of the checkpoint size CPS being stored in the journal buffer 202a.

Figure 12:
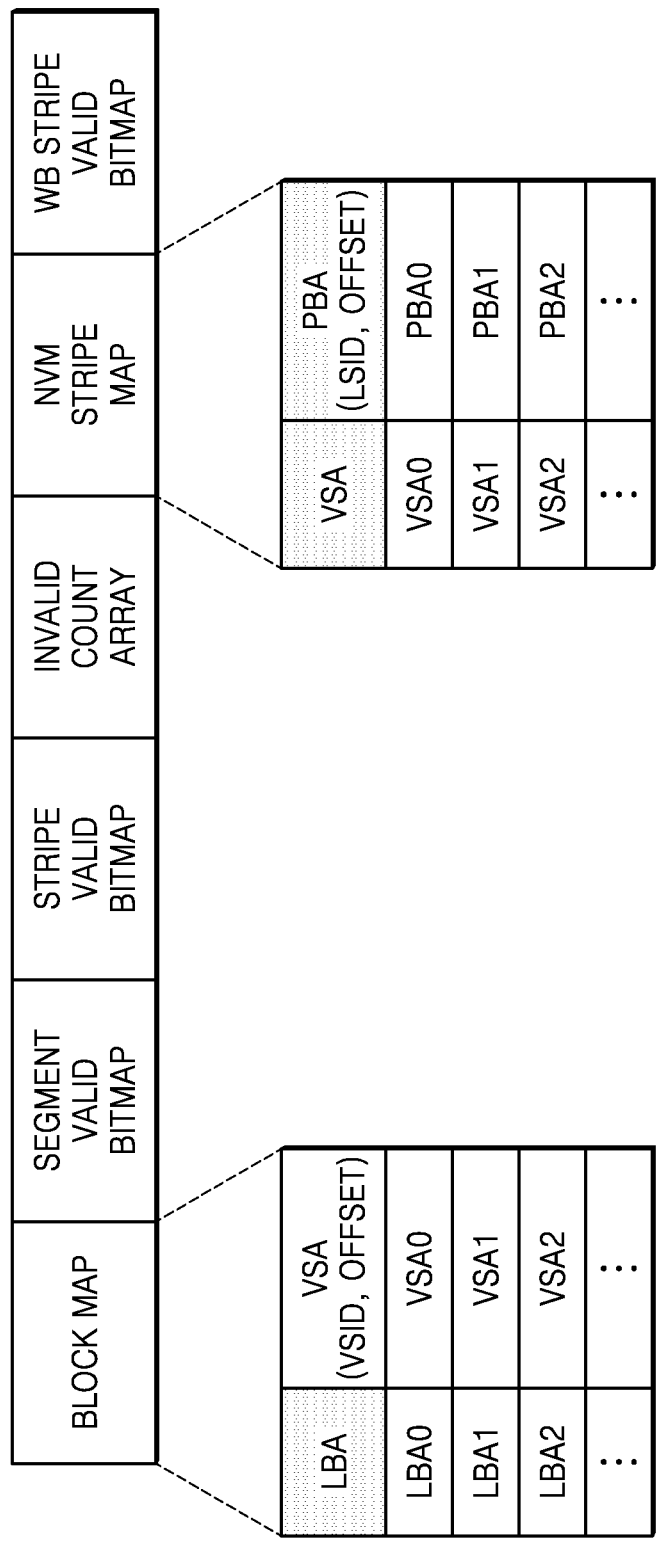
FIG. 12 is a diagram for describing metadata according to another embodiment of the present invention.

FIG. 12 is a diagram for describing metadata according to another embodiment of the present invention.

Referring to FIG. 12, metadata according to another embodiment of the present invention may include first map data BLOCK MAP, second map data NVM STRIPE MAP, first allocation data SEGMENT VALID BITMAP, second allocation data STRIPE VALID BITMAP, third allocation data WB STRIPE VALID BITMAP, and invalid count data INVALID COUNT ARRAY.

The first map data BLOCK MAP may be data indicating mapping information between a logical address LBA and a first address VSA. The first address VSA may be an address of the write buffer 201a. In an embodiment, the first address VSA is a virtual address and may include first stripe information VSID and offset information OFFSET. The first stripe information VSID may be information indicating a number of a selected stripe among a plurality of stripes included in the write buffer 201a. The offset information OFFSET may be information indicating the number of a memory block in which write data is last stored.

The second map data NVM STRIPE MAP may be data indicating mapping information between the first address VSA and the second address PBA. The second address PBA may be a physical address of a selected memory block among a plurality of memory blocks included in the non-volatile storage device 200b. The second address PBA may include second stripe information LSID and offset information OFFSET. The second stripe information LSID is the same as described above with reference to FIGS. 2 and 4. The offset information OFFSET of the first address VSA and the offset information OFFSET of the second address PBA may have the same value.

The first allocation data SEGMENT VALID BITMAP may be data indicating whether to allocate a plurality of segments included in the non-volatile storage device 200b. The first allocation data SEGMENT VALID BITMAP is the same as described above with reference to FIGS. 2 and 4.

The second allocation data STRIPE VALID BITMAP may be data indicating whether to allocate a plurality of stripes included in the non-volatile storage device 200b.

In one embodiment, when the non-volatile storage device 200b includes the first memory block group, the first allocation data SEGMENT VALID BITMAP and the second allocation data STRIPE VALID BITMAP may represent information on a storage space allocated in the first memory block group.

The third allocation data WB STRIPE VALID BITMAP may be data indicating information on the storage space allocated in the write buffer 201a. In an embodiment, the third allocation data WB STRIPE VALID BITMAP may be data indicating whether to allocate a plurality of stripes included in the write buffer 201a.

The invalid count data INVALID COUNT ARRAY may be data indicating the number of times that data stored in the non-volatile storage device 200b is processed as invalid. In an embodiment, the invalid count data INVALID COUNT ARRAY may be data indicating the number of times that a memory block is processed as invalid in the first memory block group included in the non-volatile storage device 200b.

Figure 13:
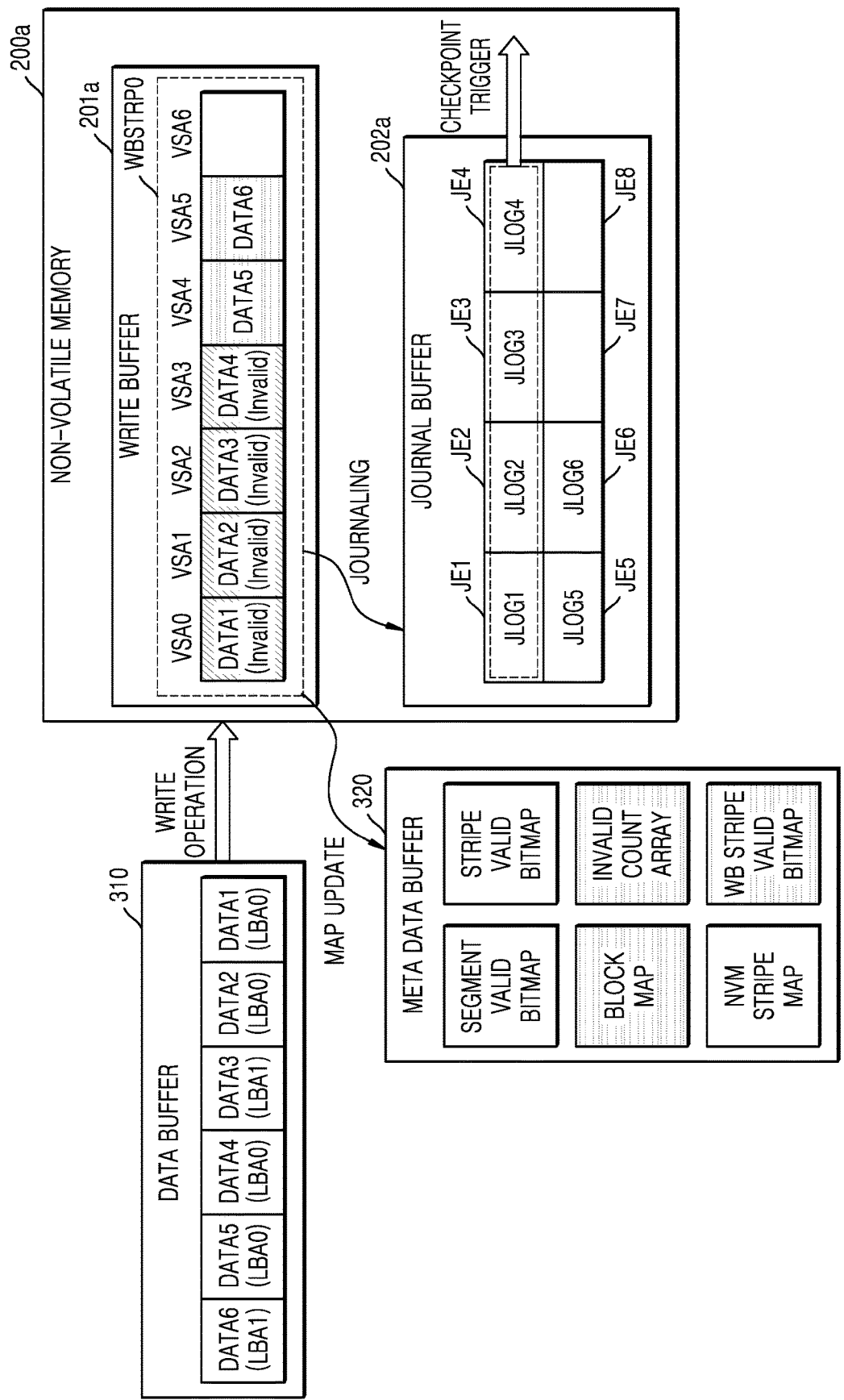
FIG. 13 is a diagram for describing a write operation, a journaling operation, and a map update operation according to another embodiment of the present invention.

FIG. 13 is a diagram for describing a write operation, a journaling operation, and a map update operation according to another embodiment of the present invention.

In describing the embodiment shown in FIG. 13, it is assumed that the write buffer 201a includes memory blocks having the 0-th address VSA0 to the fourth address VSA4, and the journal buffer 202a includes eight journal entries JE1 to JE8. It is assumed that the memory blocks having the 0-th stripe WBSTRP0 of the write buffer 201a and having the 0-th address VSA0 to the n-th address VSAn are included in the 0-th stripe WBSTRP0.

Referring to FIG. 13, pieces of write data DATA1 to DATA6 that are not grouped into a transaction may be sequentially transmitted to the storage device 1000. The memory controller 100 may convert the 0-th logical address LBA0 into the 0-th address VSA0. The 0-th address VSA0 may be the address of the first memory block included in the 0-th stripe WBSTRP0 of the write buffer 201a. The memory controller 100 displays the allocation information VALID of the 0-th stripe WBSTRP0 as TRUE and generates offset information OFFSET indicating a value of 0 to allocate a memory block with the 0-th address VSA0. Write data DATA1 may be stored in a memory block having a 0-th address VSA0, the mapping information between the 0-th logical address LBA0 and the 0-th address VSA0 may be reflected in the map data BLOCK MAP, and allocation information VALID of the changed 0-th stripe WBSTRP0 may be reflected in the third allocation data WB STRIPE VALID BITMAP. The memory controller 100 may provide a journaling command, an address corresponding to the journal buffer 202a, and a journal log JLOG1 to the non-volatile memory device 200a in response to the write data DATA1 being stored in the write buffer 201a. The journal log JLOG1 may be stored in the first journal entry JE1 of the journal buffer 202a, and may indicate mapping information between the 0-th logical address LBA0 and the 0-th address VSA0.

The 0-th logical address LBA0 may be mapped to the first address VSA1, and the write data DATA2 corresponding to the 0-th logical address LBA0 may be stored in the memory block having the first address VSA1. The value of the offset information OFFSET may be changed from 0 to 1. The write data DATA1 may be processed as invalid. Mapping information between the 0-th logical address LBA0 and the first address VSA1 may be reflected in the map data BLOCK MAP, and the invalid count of the 0-th stripe WBSTRP0 may be changed in the invalid count data INVALID COUNT ARRAY. The journal log JLOG2 generated by the memory controller 100 may be stored in the second journal entry JE2, and may indicate mapping information between the 0-th logical address LBA0 and the first address VSA1.

The first logical address LBA1 may be mapped to the second address VSA2, and the write data DATA3 corresponding to the first logical address LBA1 may be stored in a memory block having the second address VSA2. The value of the offset information OFFSET may be changed from 1 to 2. Mapping information between the first logical address LBA1 and the second address VSA2 may be reflected in the map data BLOCK MAP. The journal log JLOG3 may be stored in the third journal entry JE3 and may indicate mapping information between the first logical address LBA1 and the second address VSA2.

The 0-th logical address LBA0 may be mapped to the third address VSA3, and the write data DATA4 corresponding to the 0-th logical address LBA0 may be stored in the memory block having the third address VSA3. Offset information OFFSET may be changed from 2 to 3. The write data DATA2 may be processed as invalid. Mapping information between the 0-th logical address LBA0 and the third address VSA3 may be reflected in the map data BLOCK MAP, and the invalid count of the 0-th stripe WBSTRP0 may be changed in the invalid count data INVALID COUNT ARRAY. The journal log JLOG4 stored in the fourth journal entry JE4 may indicate mapping information between the 0-th logical address LBA0 and the third address VSA3.

When the journal logs JLOG1 to JLOG4 of the checkpoint size CPS are stored in the journal buffer 202a, a checkpoint event may occur. The checkpoint event may include, for example, metadata from the metadata buffer 320 to be written to the non-volatile storage device 200a. After the checkpoint event occurs, the 0-th logical address LBA0 may be mapped to the fourth address VSA4, and the write data DATA5 corresponding to the 0-th logical address LBA0 may be stored in the memory block having the fourth address VSA4. Offset information OFFSET may be changed from 3 to 4. The write data DATA4 may be processed as invalid. Mapping information between the 0-th logical address LBA0 and the fourth address VSA4 may be reflected in the map data BLOCK MAP. In the invalid count data INVALID COUNT ARRAY, the invalid count of the 0-th stripe WBSTRP0 may be changed. The journal log JLOG5 stored in the fifth journal entry JE5 may indicate mapping information between the 0-th logical address LBA0 and the fourth address VSA4.

The first logical address LBA1 may be mapped to the fifth address VSA5, and the write data DATA6 corresponding to the first logical address LBA1 may be stored in a memory block having the fifth address VSA5. Offset information OFFSET may be changed from 4 to 5. The write data DATA3 may be processed as invalid. Mapping information between the first logical address LBA1 and the fifth address VSA5 may be reflected in the map data BLOCK MAP. In the invalid count data INVALID COUNT ARRAY, the invalid count of the 0-th stripe WBSTRP0 may be changed. The journal log JLOG6 stored in the sixth journal entry JE6 may indicate mapping information between the first logical address LBA1 and the fifth address VSA5. For these changes, the metadata stored in the metadata buffer 320 is updated.

When the checkpoint is triggered, the memory controller 100 may provide to the volatile memory 300 a flush command that commands the updated metadata to be flushed to the non-volatile storage device 200b.

After the metadata is stored in the non-volatile storage device 200b, the memory controller 100 may control the non-volatile memory device 200a to release the journal logs JLOG1 to JLOG4 stored in the journal buffer 202a.

According to the above, by journaling the update information of the map data corresponding to the representative metadata, a decrease in performance due to journaling may be minimized, and power unnecessarily wasted in a storage device may be reduced.

Figure 14:
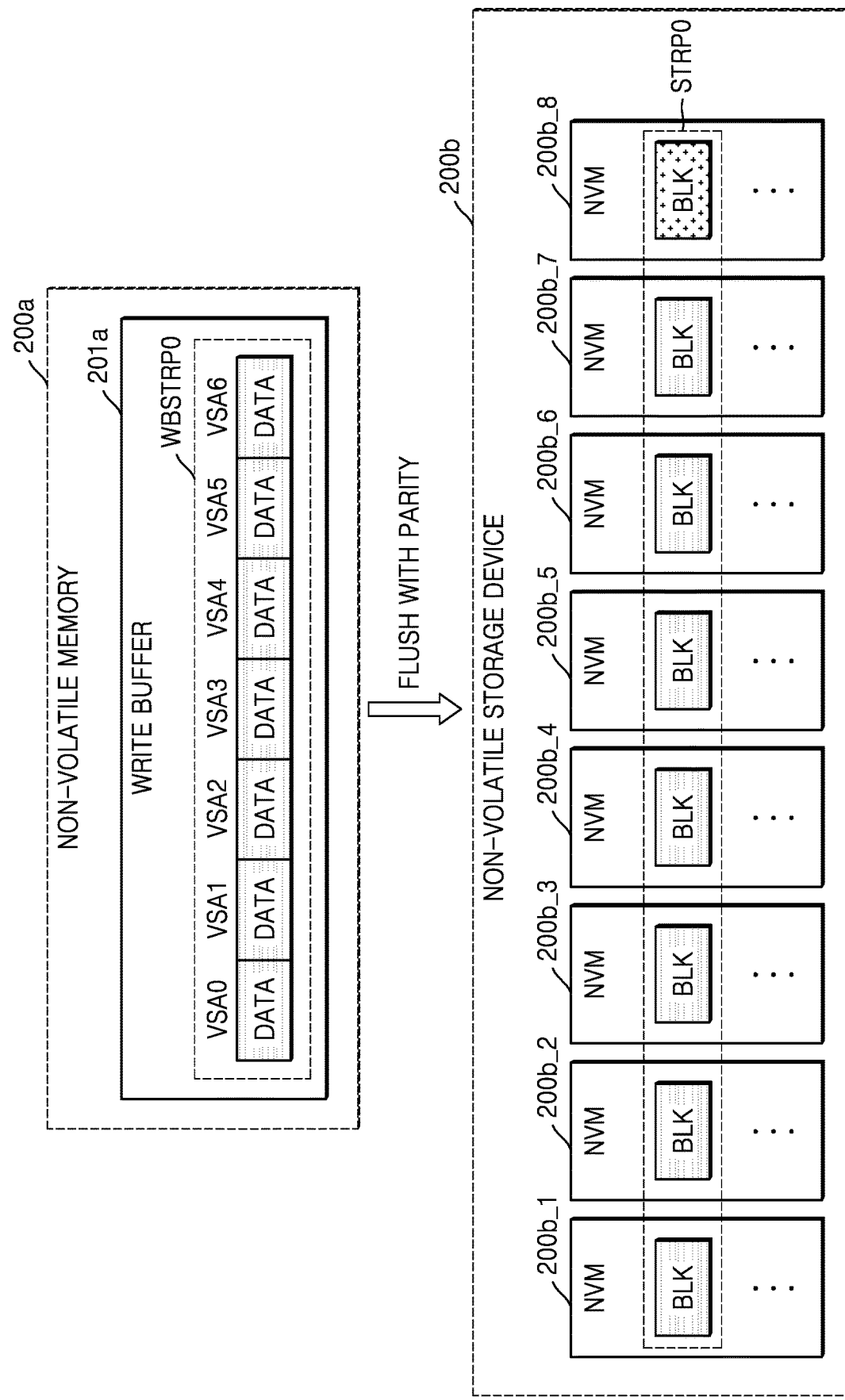
FIG. 14 is a diagram for describing an operation of flushing write data stored in a write buffer.

FIG. 14 is a diagram for describing an operation of flushing write data stored in a write buffer.

In describing the embodiment shown in FIG. 14, in the non-volatile storage device 200b, eight non-volatile storage devices 200b_1 to 200b_8 are logically operated as one non-volatile memory device, and it is assumed that each of the eight non-volatile storage devices 200b_1 to 200b_8 is implemented as a memory chip (e.g., a semiconductor die having an integrated circuit formed thereon).

Referring to FIG. 14, when write data DATA corresponding to the size of the write buffer 201a is stored in the write buffer 201a, the memory controller 100 may control the non-volatile memory device 200a to store the write data DATA stored in the write buffer 201a in the first memory block group. Here, the first memory block group may be included in each of the seven non-volatile storage devices 200b_1 to 200b_7, for example, and may include memory blocks BLK0 included in the 0-th stripe STRP0.

In an embodiment, when the write data DATA stored in the write buffer 201a is stored in the first memory block group, the memory controller 100 may journal update information on mapping information between the logical address LBA and the second address PBA of the first memory block group. Map data indicating mapping information between the logical address LBA and the physical address PBA of the first memory block group may be first map data BLOCK MAP and second map data NVM STRIPE MAP. For example, after the update information on the mapping information between the logical address LBA and the first address VSA is journaled, update information on mapping information between the first address VSA and the second address PBA of the first memory block group may be journaled.

In this embodiment, when the write data DATA stored in the write buffer 201a is stored in the first memory block group, update information on mapping information between the logical address LBA and the first address VSA may be journaled.

The memory controller 100 may control the non-volatile memory device 200a to generate parity for the write data DATA stored in the write buffer 201a, and to store the parity in the second memory block group. Here, the second memory block group may be included in the eighth non-volatile memory device 200b_8, for example, and may include a memory block BLK0 included in the 0-th stripe STP0.

Referring to FIGS. 13 and 14, when the write data DATA stored in the write buffer 201a is stored in the first memory block group, the second map data NVM STRIPE MAP, the first allocation data SEGMENT VALID BITMAP, and the second allocation data STRIPE VALID BITMAP may be updated. In addition, as the checkpoint is triggered, first map data BLOCK MAP, second map data NVM STRIPE MAP, first allocation data SEGMENT VALID BITMAP, second allocation data STRIPE VALID BITMAP, third allocation data WB STRIPE VALID BITMAP, and invalid count data INVALID COUNT ARRAY may be stored in the second memory block group of the non-volatile storage device 200b.

According to another embodiment shown in FIG. 14, first, write data may be stored in the write buffer 201a without parity, and parity for write data stored as much as the memory size of the write buffer 201a may be generated later at once. Accordingly, the performance of a write operation according to another embodiment may be higher than that of a write operation according to an embodiment.

In that the storage device 1000' shown in FIG. 11 further includes a non-volatile memory device 200a that is a physical configuration other than the storage device 1000 shown in FIG. 1, the degree of integration of the storage device 1000 illustrated in FIG. 1 may be higher than that of the storage device 1000' illustrated in FIG. 11.

Figure 15:
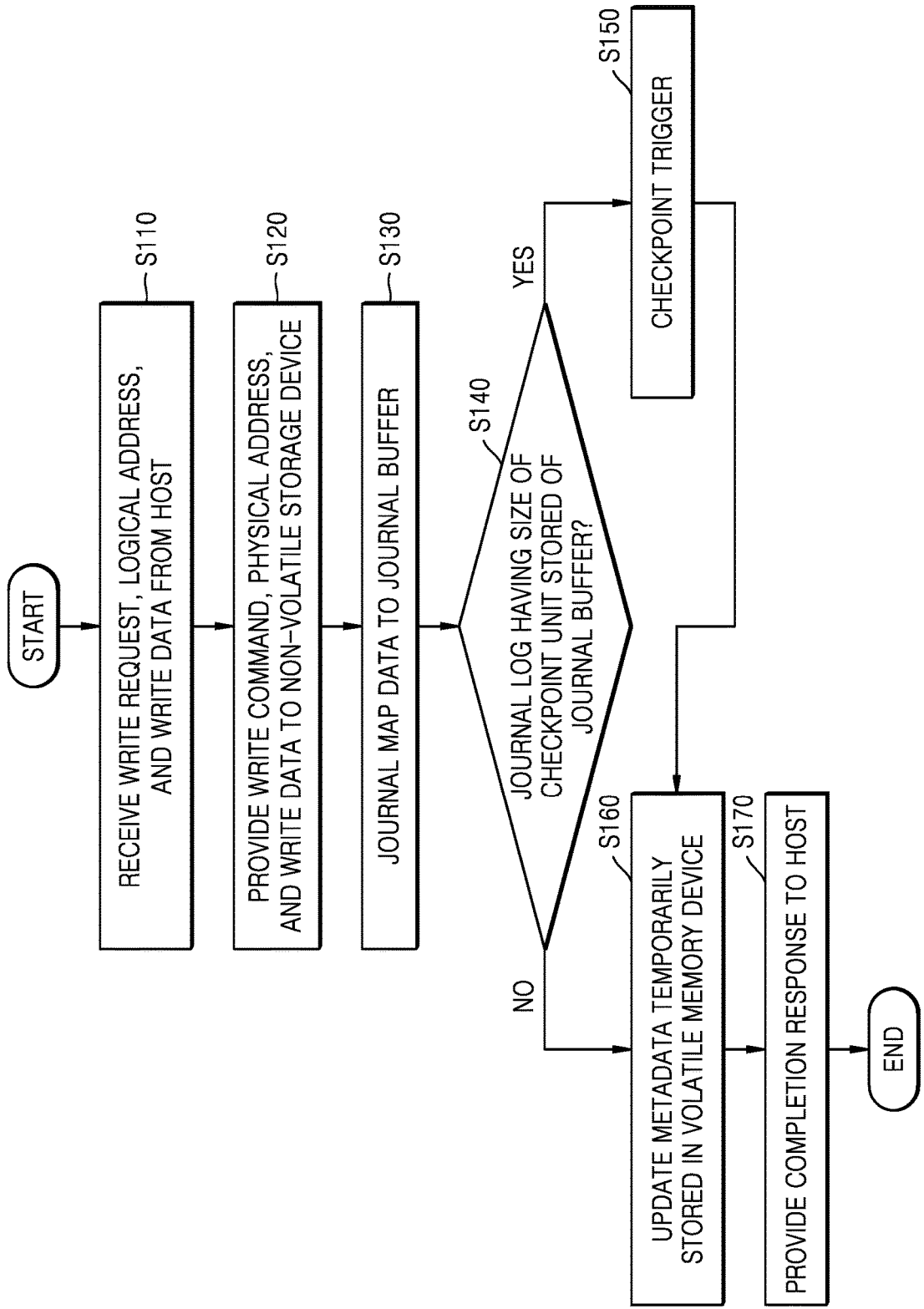
FIG. 15 is a flowchart illustrating a first operation method of a memory controller.

FIG. 15 is a flowchart illustrating a first operation method of a memory controller.

Referring to FIG. 15, the memory controller 100 receives a write request, a logical address, and write data from the host 2000 (S110). Here, the write data may be write data that is not grouped into a transaction. A description of this is as described above with reference to FIG. 5 or 13.

The memory controller 100 provides a write command, a physical address, and write data to the non-volatile storage device 200 (S120). A description of this is as described above with reference to FIG. 5 or 13.

The memory controller 100 may journal the map data to the journal buffer in response to the write data being stored in the non-volatile storage device 200 (S130). Here, the journal buffer may be a second memory area 201 that is logically operated as described above with reference to FIG. 3 or a physical journal buffer 202a as described above with reference to FIG. 11. Journaling the map data may mean that the journal log is stored in the journal buffer. The journal log may be data indicating update information on mapping information between a logical address and a physical address, for example.

The memory controller 100 monitors whether a journal log having a size of a checkpoint unit is stored in the journal buffer (S140). Here, the size of the checkpoint unit may be the checkpoint size CPS described above with reference to FIG. 3.

If the storage space taken up by the journal log in the journal buffer has reached the checkpoint size (S140, YES), the memory controller 100 triggers a checkpoint (S150). When the checkpoint is triggered, it means that the checkpoint is started, and a description thereof is as given above with reference to FIG. 5.

When the journal log having the size of the checkpoint unit is not stored in the journal buffer (S140, No) or after operation S140, the memory controller 100 updates metadata temporarily stored in the volatile memory 300 (S160). A description of this is as given above with reference to FIG. 5 or 13. Although not shown in the drawing, after operation S150, the journal log having the size of the checkpoint unit may be deleted. For example, in some embodiments, after operation S150 (e.g., checkpoint is triggered) and after the checkpoint is completed, the journal log having the size of the checkpoint unit may be deleted.

The memory controller 100 provides a response to the write request to the host 2000 (S170).

Figure 16:
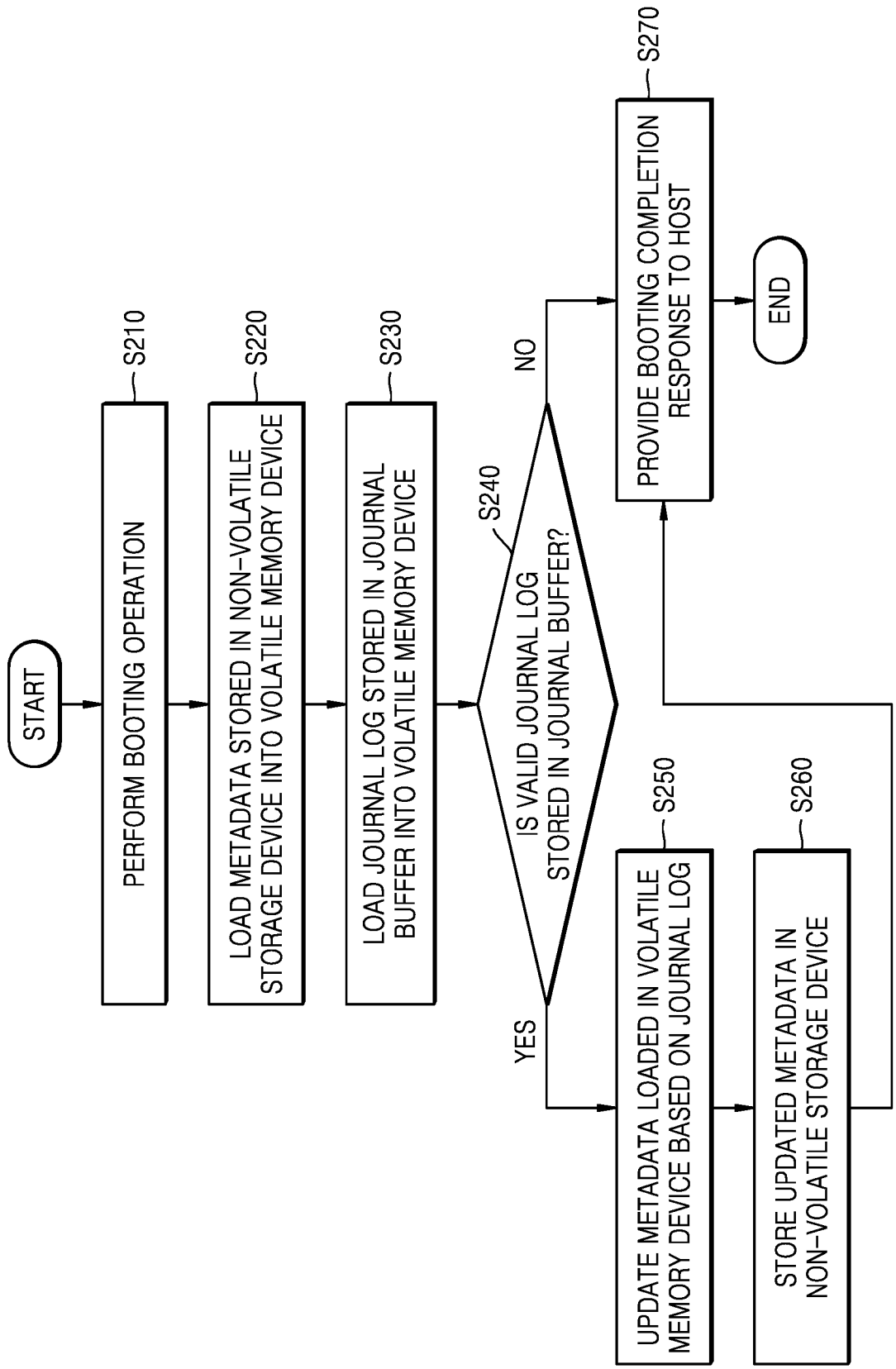
FIG. 16 is a flowchart illustrating a second operation method of a memory controller.

FIG. 16 is a flowchart illustrating a second operation method of a memory controller.

Referring to FIG. 16, the memory controller 100 performs a booting operation in response to power supplied from the outside (S210).

The memory controller 100 loads metadata stored in the non-volatile storage device 200 into the volatile memory 300 (S220). A description of this is as described above with reference to FIG. 10. Here, the metadata stored in the non-volatile storage device 200 may be data updated based on the first journal log group before power is supplied. The first journal log group may include, for example, first to fourth journal logs JLOG1 to JLOG4 released according to a checkpoint before power is supplied.

The memory controller 100 loads the journal log stored in the journal buffer into the volatile memory 300 (S230). A description of this is as described above with reference to FIG. 9.

The memory controller 100 checks whether a valid journal log is stored in the journal buffer (S240). A description of this is as described above with reference to FIG. 9.

If a valid journal log is stored in the journal buffer (S240, YES), the memory controller 100 updates metadata loaded in the volatile memory 300 based on the journal log (S250). For example, when a plurality of memory blocks included in the non-volatile storage device 200 are grouped in stripe units, the physical address of the memory block in which the write data is stored includes stripe information and offset information, and the offset information is information indicating the number of the first memory block, the memory controller 100 may generate second allocation data STRIPE VALID BITMAP indicating that the stripes are allocated. For another example, when a plurality of stripes are grouped in a preset segment unit, and the stripe information is information indicating the number of the first stripe included in each segment, the memory controller 100 may generate first allocation data SEGMENT VALID BITMAP indicating that a segment including a stripe corresponding to the stripe information is allocated.

In an embodiment, the first journal log and the second journal log stored later than the first journal log may be stored in the journal buffer. When the first journal log indicates first mapping information between the first logical address and the first physical address, and the second journal log indicates second mapping information between the first logical address and the second physical address, the memory controller 100 generates first map data indicating first mapping information based on the first journal log, and after the generating of the first map data, changes the first map data to second map data indicating second mapping information based on the second journal log. Further, in response to the generation of the second map data, the memory controller 100 may generate invalid count data in which the invalid count for the memory block having the first physical address is increased. A description of this is as described above with reference to FIG. 12.

The memory controller 100 stores the updated metadata in the non-volatile storage device 200 (S260). For example, the memory controller 100 may provide to the non-volatile storage device 200 a write command including instructions to store updated metadata, a physical address of a memory block in which the updated metadata is to be stored, and updated metadata. A description of this is as described above with reference to FIG. 11.

When a valid journal log is not stored in the journal buffer (S240, NO) or after operation S260, a boot completion response is provided to the host 2000 (S270).

As described above, even when an unexpected event such as a sudden power off or a kernel panic occurs, consistency between the metadata and the journal log may be ensured, and the reliability of the storage device may be improved.

While the inventive concept has been particularly shown and described with reference to embodiments thereof, it will be understood that various changes in form and details may be made therein without departing from the spirit and scope of the following claims.

What is claimed is:

1. A storage device comprising:
   a non-volatile memory device including a write buffer in which write data that is not grouped into a transaction is stored, and a journal buffer in which a journal log indicating update information on metadata of the write data is stored;
   a volatile memory device configured to temporarily store first metadata, wherein the first metadata is data updated based on a first journal log group including a journal log to be released from the journal buffer in response to a checkpoint event; and
   a memory controller configured to control the volatile memory device to trigger a checkpoint for releasing the first journal log group in the journal buffer, update the first metadata to second metadata based on a second journal log group including a journal log excluding the first journal log group in the journal buffer, and store the second metadata.

2. The storage device of claim 1, wherein the journal log is data indicating update information on mapping information between a logical address provided from a host and an address of the write buffer,
   wherein the first metadata comprises map data indicating the mapping information, and allocation data indicating information on a storage space allocated in the write buffer.

3. The storage device of claim 2, wherein the write buffer comprises a stripe, which is a logical group in which a plurality of memory blocks operate as one memory block,
   wherein the address of the write buffer comprises stripe information indicating a number of the stripe, and offset information indicating a number of a memory block in which the write data is last stored among memory blocks included in the stripe, and
   wherein the memory controller is configured to update the first metadata to the second metadata by changing at least one of the stripe information and the offset information.

4. The storage device of claim 1, further comprising a non-volatile storage device including a first memory block group in which the write data is stored and a second memory block group in which the metadata is stored,
   wherein the memory controller is configured to provide, to the volatile memory device, a flush command including an instruction to flush the second metadata temporarily stored in the volatile memory device to the non-volatile storage device.

5. The storage device of claim 4, wherein the memory controller is configured to provide a journaling command including an instruction to delete the first journal log group from the non-volatile memory device after the second metadata is stored in the non-volatile storage device.

6. The storage device of claim 1, wherein the checkpoint event is an event in which a size of the journal log stored in the journal buffer corresponds to a preset memory size.

7. A storage device comprising:
   a non-volatile storage device including a first memory area in which write data that is not grouped into a transaction is stored, a second memory area in which a journal log indicating update information on metadata of the write data is stored, and a third memory area in which the metadata is stored;
   a volatile memory device configured to temporarily store first metadata, wherein the first metadata is data updated based on a first journal log group including a journal log to be deleted from the second memory area in response to a checkpoint event; and
   a memory controller configured to control the volatile memory device to trigger a checkpoint for deleting the first journal log group in the second memory area, update the first metadata to second metadata based on a second journal log group including a journal log excluding the first journal log group in the second memory area, and store the second metadata.

8. The storage device of claim 7, wherein the journal log is data indicating update information on mapping information between a logical address provided from a host and a physical address of a memory area in which the write data is stored in the first memory area,
wherein the first metadata comprises map data indicating the mapping information, and allocation data indicating information on a memory area allocated from the first memory area.

9. The storage device of claim 8, wherein the first memory area comprises two or more stripes, which are logical groups in which a plurality of memory blocks included in the non-volatile storage device operate as one memory block,
wherein the physical address of the memory area where the write data is stored comprises stripe information indicating a number of the stripe, and offset information indicating a number of the memory block in which the write data is last stored among the memory blocks included in the stripe.

10. The storage device of claim 9, wherein the memory controller is configured to update the first metadata to the second metadata by changing at least one of the stripe information and the offset information.

11. The storage device of claim 7, wherein the memory controller is configured to provide, to the volatile memory device, a flush command instructing the volatile memory device to flush the second metadata temporarily stored in the volatile memory device.

12. The storage device of claim 11, wherein the memory controller provides, to the non-volatile storage device, a trim command instructing the non-volatile storage device to delete the first journal log group after the second metadata is stored in the non-volatile storage device.

13. The storage device of claim 7, wherein the checkpoint event is an event in which a size of the journal log stored in the second memory area corresponds to a preset memory size.

14. An operation method of a memory controller, the method comprising:
receiving first metadata stored in a non-volatile storage device and a journal log stored in a journal buffer in response to power provided from outside the memory controller and non-volatile storage device, wherein the first metadata is data updated based on a first journal log group including a journal log released from the journal buffer before the power is supplied;
generating second metadata, based on the journal log, the second metadata including map data indicating mapping information between a logical address and a physical address and allocation data indicating information on a memory area allocated in the non-volatile storage device; and
providing, to the non-volatile storage device, a command instructing the non-volatile storage device to store the second metadata, a physical address of a memory block in which metadata is stored among a plurality of memory blocks included in the non-volatile storage device, and the second metadata.

15. The method of claim 14, wherein the journal log is data indicating update information on mapping information between a logical address provided from a host and a physical address of a memory block in which write data is stored among a plurality of memory blocks included in the non-volatile storage device.

16. The method of claim 15, wherein the memory area comprises two or more stripes, which are logical groups in which a plurality of memory blocks included in the non-volatile storage device operate as one memory block,
wherein the physical address of the memory area where the write data is stored comprises stripe information indicating a number of the stripe, and offset information indicating a number of the memory block in which the write data is last stored among the memory blocks included in the stripe.

17. The method of claim 16, wherein the offset information is information indicating a number of a first memory block,
wherein the generating of the second metadata generates data indicating that the stripe is allocated as the allocation data.

18. The method of claim 17, wherein the memory area comprises two or more segments in which a plurality of stripes are logically grouped,
wherein the stripe information is information indicating a number of the first stripe included in each segment,
wherein the generating of the second metadata generates, as the allocation data, data indicating that a segment including a stripe corresponding to the stripe information is allocated.

19. The method of claim 15, wherein the journal log comprises a first journal log indicating first mapping information between a first logical address and a first physical address, and a second journal log indicating second mapping information between the first logical address and a second physical address and stored later than the first journal log,
wherein the generating of the second metadata comprises:
generating first map data indicating the first mapping information based on the first journal log; and
changing the first map data to second map data indicating the second mapping information based on the second journal log after the generating of the first map data.

20. The method of claim 19, wherein the second metadata further comprises invalid count data indicating an invalid count, which is a number associated with invalidating a memory block in a segment unit,
wherein the generating of the second metadata further comprises generating invalid count data having an increased invalid count for a memory block having a first physical address in response to the generation of the second map data.

* * * * *